(12) United States Patent
Ohno et al.

(10) Patent No.: US 10,071,702 B2
(45) Date of Patent: Sep. 11, 2018

(54) VEHICLE OCCUPANT PROTECTION DEVICE

(71) Applicant: TOYOTA JIDOSHA KABUSHIKI KAISHA, Toyota-shi, Aichi-ken (JP)

(72) Inventors: Mitsuyoshi Ohno, Miyoshi (JP); Shinichi Ishida, Kiyosu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/347,401

(22) Filed: Nov. 9, 2016

(65) Prior Publication Data

US 2017/0136977 A1    May 18, 2017

(30) Foreign Application Priority Data

Nov. 12, 2015  (JP) .................. 2015-221912

(51) Int. Cl.
*B60R 21/207* (2006.01)
*B60R 21/013* (2006.01)
(Continued)

(52) U.S. Cl.
CPC .......... *B60R 21/207* (2013.01); *B60R 21/013* (2013.01); *B60R 21/231* (2013.01); *B60R 21/237* (2013.01); *B60R 21/2334* (2013.01); *B60R 21/2342* (2013.01); *B60R 21/261* (2013.01); *B60R 21/262* (2013.01); *B60R 21/264* (2013.01); *B60R 2021/0004* (2013.01); *B60R 2021/0006* (2013.01); *B60R 2021/0009* (2013.01); *B60R 2021/0023* (2013.01); *B60R 2021/0044* (2013.01);
(Continued)

(58) Field of Classification Search
CPC .................................. B60R 21/207
See application file for complete search history.

(56) References Cited

U.S. PATENT DOCUMENTS 3,753,576 A * 8/1973 Gorman ................ B60R 21/207
                                                  280/730.1
3,779,577 A * 12/1973 Wilfert ................. B60R 21/207
                                                  280/730.1
(Continued)

FOREIGN PATENT DOCUMENTS

DE         198 59 988 A1     6/2000
DE     102013200667 A1 *     7/2014 ........... B60R 21/207
(Continued)

*Primary Examiner* — Nicole T Verley
(74) *Attorney, Agent, or Firm* — Oliff PLC

(57) ABSTRACT

A vehicle occupant protection device includes: an airbag that is configured to be stowed in a headrest, to receive a gas supply and is formed as a single bag body that, in an inflated and expanded state, includes a front inflation portion configured to be disposed at the front in a seat front-rear direction relative to a head of a vehicle occupant, and a pair of side inflation portions configured to be disposed at both sides in a seat width direction relative to the head of the vehicle occupant; an inflator that is fixed to an upper portion of a seatback frame in an attitude with a long dimension of the inflator in the seat width direction, the upper portion of the seatback frame extending in the seat width direction; and a fluid communication structure that communicates between the inflator and the airbag to allow a flow of gas.

7 Claims, 13 Drawing Sheets

(51) Int. Cl.
  *B60R 21/2334* (2011.01)
  *B60R 21/2342* (2011.01)
  *B60R 21/237* (2006.01)
  *B60R 21/262* (2011.01)
  *B60R 21/264* (2006.01)
  *B60R 21/231* (2011.01)
  *B60R 21/261* (2011.01)
  *B60R 21/00* (2006.01)
  *B60R 21/01* (2006.01)
  *B60R 21/02* (2006.01)
  *B60R 21/235* (2006.01)

(52) U.S. Cl.
  CPC .............. *B60R 2021/0048* (2013.01); *B60R 2021/01013* (2013.01); *B60R 2021/01286* (2013.01); *B60R 2021/0273* (2013.01); *B60R 2021/2074* (2013.01); *B60R 2021/23514* (2013.01); *B60R 2021/23538* (2013.01); *B60R 2021/23576* (2013.01); *B60R 2021/2612* (2013.01)

(56) References Cited

U.S. PATENT DOCUMENTS

| | | | | |
|---|---|---|---|---|
| 3,953,049 A * | 4/1976 | Surace | ............. | B60R 21/08 280/730.1 |
| 5,911,433 A * | 6/1999 | Swann | ............. | B60R 21/207 280/730.2 |
| 5,913,536 A * | 6/1999 | Brown | ............. | B60R 21/207 280/728.2 |
| 6,158,812 A * | 12/2000 | Bonke | ............. | B60N 2/4805 297/216.12 |
| 6,199,900 B1 * | 3/2001 | Zeigler | ............. | B60N 2/4829 280/730.2 |
| 6,217,118 B1 * | 4/2001 | Heilig | ............. | B60N 2/427 297/410 |
| 6,425,602 B1 * | 7/2002 | Al-Amin | ............. | B60R 21/207 280/730.1 |
| 6,474,733 B1 * | 11/2002 | Heilig | ............. | B60N 2/4415 297/216.12 |
| 6,568,754 B1 * | 5/2003 | Norton | ............. | B60N 2/4864 297/216.12 |
| 7,048,334 B2 * | 5/2006 | Pal | ............. | B60N 2/4279 297/216.12 |
| 7,150,468 B2 * | 12/2006 | Pan | ............. | B60R 21/207 280/730.1 |
| 7,431,331 B2 * | 10/2008 | Siemiantkowski | ... | B60R 21/207 280/728.2 |
| 8,167,376 B2 * | 5/2012 | Song | ............. | B60N 2/4814 297/217.3 |
| 8,348,338 B2 * | 1/2013 | Galecka | ............. | B60N 2/4808 297/216.12 |
| 8,485,551 B2 * | 7/2013 | Dainese | ............. | B60R 21/207 280/730.1 |
| 8,899,619 B2 * | 12/2014 | Fukawatase | ............. | B60R 21/207 280/730.2 |
| 8,985,622 B1 * | 3/2015 | Cannon | ............. | B60N 2/4882 280/730.2 |
| 9,238,425 B2 * | 1/2016 | Fukawatase | ............. | B60R 21/13 |
| 2004/0169356 A1 * | 9/2004 | Linder | ............. | B60R 21/23138 280/730.2 |
| 2013/0015642 A1 * | 1/2013 | Islam | ............. | B60R 21/207 280/730.1 |
| 2014/0327234 A1 * | 11/2014 | Heurlin | ............. | B60R 21/207 280/730.1 |
| 2016/0082915 A1 * | 3/2016 | Madaras | ............. | B60R 21/231 297/216.2 |
| 2016/0347272 A1 * | 12/2016 | Kato | ............. | B60R 21/207 |
| 2017/0144622 A1 * | 5/2017 | Perlo | ............. | B60R 21/207 |

FOREIGN PATENT DOCUMENTS

| | | |
|---|---|---|
| JP | 2000-344044 A | 12/2000 |
| JP | 2006-297997 A | 11/2006 |
| JP | 2013-018378 A | 1/2013 |
| WO | WO-2017171086 A1 * | 10/2017 ............. B60R 21/02 |

* cited by examiner

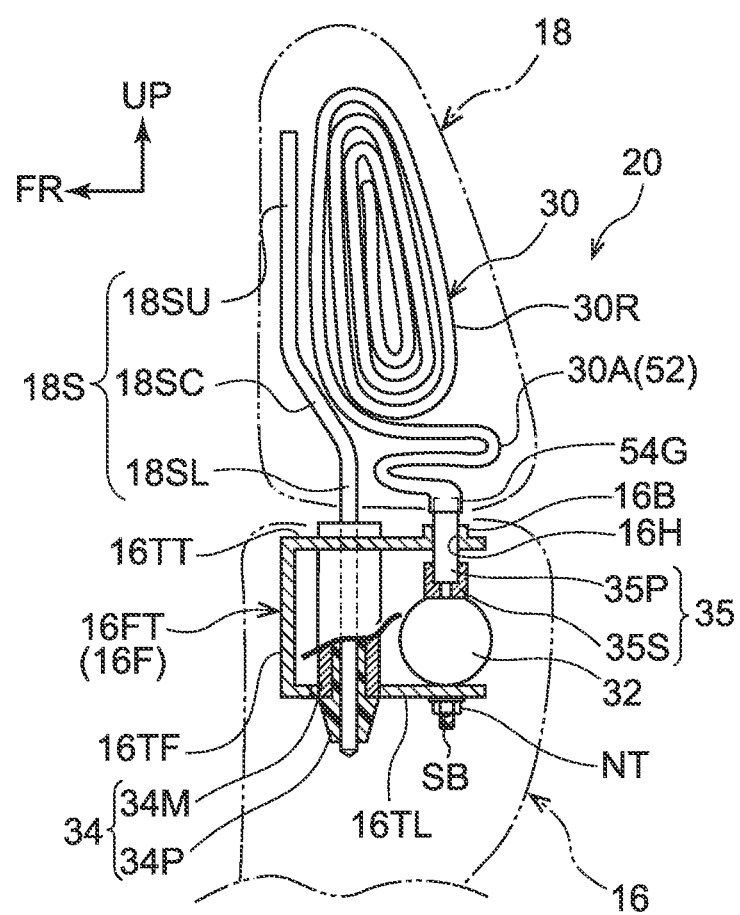

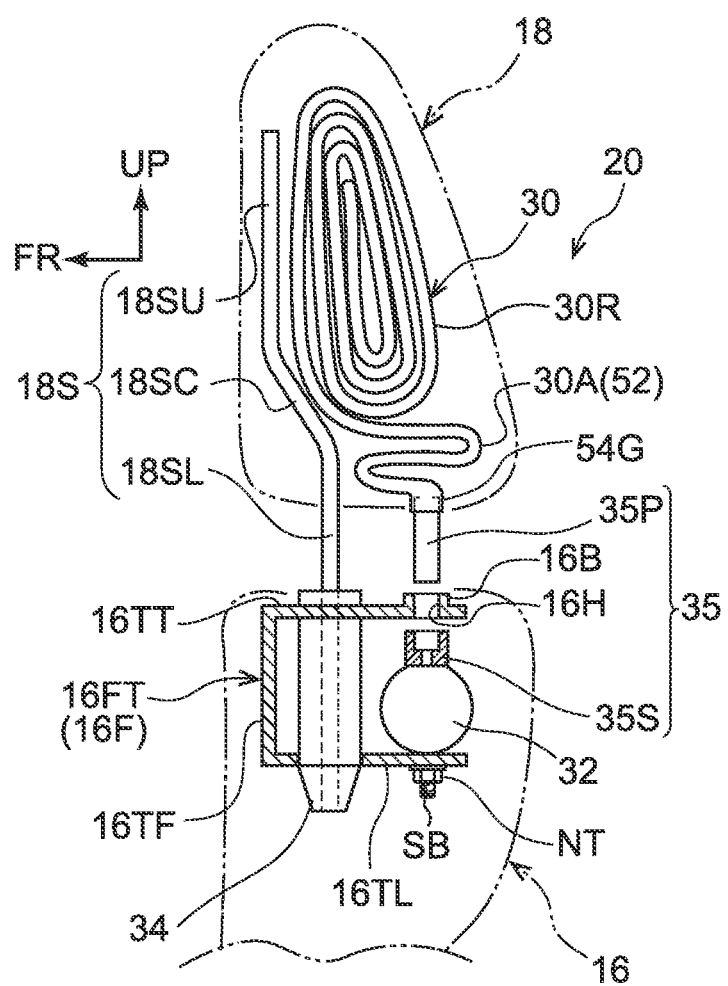

VEHICLE OCCUPANT PROTECTION DEVICE

CROSS-REFERENCE TO RELATED APPLICATION

This application is based on and claims priority under 35 USC 119 from Japanese Patent Application No. 2015-221912 filed on Nov. 12, 2015, the disclosure of which is incorporated by reference herein.

BACKGROUND

Technical Field

The present disclosure relates to a vehicle occupant protection device.

Related Art

An airbag device is known (for example, see Japanese Patent Application Laid-Open (JP-A) No. 2000-344044) in which, at a time of collision, gas from an inflator is supplied through a gas supply pipe fixed to a seatback into a bag attached to the gas supply pipe and inflates the bag so as to surround the front and sides of a vehicle occupant. An airbag device is also known (for example, see JP-A No. 2013-018378) in which head airbags inflate forward from left and right side portions of a headrest, and come together at the front face of the head of a vehicle occupant, while a head auxiliary airbag inflates forward from a central portion of the headrest and comes together with the pair of head airbags.

In the structure of JP-A No. 2000-344044, because the gas supply pipe is provided to protrude above the seatback, appearance is poor and the gas supply pipe is an impediment to operations of the vehicle seat. This problem has been addressed by structures in which a head airbag is stowed in a headrest, such as in JP-A No. 2013-018378.

However, the volume of an airbag that includes a front inflation portion and a pair of side inflation portions, which is to be inflated and expanded to the front and both sides of the head of a vehicle occupant, is large but space for stowage thereof in a headrest is limited. Therefore, stowing the above-described airbag with a large volume, and an inflator with a large volume that supplies gas to this airbag, in a headrest while assuring designability of the headrest is difficult. Therefore, in a structure in which an inflator is simply disposed in a seatback, there is scope for improvement with regard to functions such as, for example, assuring cushioning of the seatback, assuring space behind the seatback and so forth.

SUMMARY

The present disclosure provides a vehicle occupant protection device that, in a structure in which an airbag including a front inflation portion and a pair of side inflation portions is stowed in a headrest, may suppress deteriorations in designability of the headrest and functionality of a seatback caused by an inflator.

One aspect of the present disclosure is a vehicle occupant protection device including: an airbag that is configured to be stowed in a headrest, to receive a gas supply and is formed as a single bag body that, in an inflated and expanded state, includes a front inflation portion configured to be disposed at the front in a seat front-rear direction relative to a head of a vehicle occupant, and a pair of side inflation portions configured to be disposed at both sides in a seat width direction relative to the head of the vehicle occupant; an inflator that is fixed to an upper portion of a seatback frame in an attitude with a long dimension of the inflator in the seat width direction, the upper portion of the seatback frame extending in the seat width direction; and a fluid communication structure that communicates between the inflator and the airbag to allow a flow of gas.

In this vehicle occupant protection device, when the gas is supplied to the airbag, the front inflation portion of the front bag inflates and expands to the seat front relative to the head of the vehicle occupant, and the pair of side bags inflate and expand at both sides in the seat width direction relative to the head of the vehicle occupant. As a result, the head of the vehicle occupant is covered from the front by the front inflation portion (the front bag) and is covered from both sides in the seat width direction by the pair of side bags.

The inflator is fixed in the attitude with the long dimension thereof in the seat width direction at the upper portion of the seatback frame that extends in the seat width direction, and the gas from the inflator is supplied to the airbag through the fluid communication structure. Therefore, compared to a structure in which an inflator is disposed in a headrest, a deterioration in designability of the headrest caused by the inflator is reduced. Furthermore, compared to a structure in which an inflator is fixed to an upper portion of a seatback frame in an attitude with the long dimension of the inflator in the vertical direction, a deterioration in functionality of the seatback caused by the inflator is reduced.

Thus, in the present vehicle occupant protection device, in the structure in which the airbag including the front inflation portion and the pair of side inflation portions is accommodated in the headrest, deteriorations in designability of the headrest and functionality of the seatback due to the inflator may be reduced.

In the present aspect, the inflator may be configured to be fixed at a fixing portion of the upper portion of the seatback frame and to be covered from above by an upper wall of the upper portion of the seatback frame, and the fluid communication structure may include a pipe portion fabricated of metal that is connected to the inflator such that, when the airbag in the inflated and expanded state receives a load toward a front in the seat front-rear direction, the pipe portion interferes with the upper wall from rearward thereof in the seat front-rear direction.

In this vehicle occupant protection device, when the airbag is subjected to a load toward the front in the seat front-rear direction in accordance with protection of the head of a vehicle occupant when there is, for example, a frontal collision, the pipe portion of the fluid communication structure that supplies the gas from the inflator to the airbag interferes with the upper wall from rearward thereof. A portion of a load (a reaction force) that the airbag receives is dispersed into the upper wall of the seatback frame via a region of interference between the pipe portion and the upper wall. Therefore, compared to a structure in which an inflator and an airbag are in fluid communication through a flexible fluid communication structure such as, for example, a resin tube or the like, the load received by the airbag may be efficiently braced by the seatback frame.

In the present aspect, the pipe portion may communicate between the inflator and the airbag to allow the flow of gas in a state in which the pipe portion penetrates through the upper wall of the upper portion of the seatback frame.

In this vehicle occupant protection device, because the pipe portion fabricated of metal that structures the fluid communication structure penetrates through the upper wall of the upper portion of the seatback frame, the gas is supplied along a shorter path from the inflator to the airbag than in a structure in which a fluid communication structure goes around the edge of an upper wall. Furthermore, the region of interference between the pipe portion and the upper wall associated with bracing of a load received by the airbag is less likely to shift in the seat width direction.

In the present aspect, the inflator may be configured to be covered from below by a lower wall of the upper portion of the seatback frame, and the vehicle occupant protection device may further include a protrusion portion fabricated of metal that protrudes from the inflator and penetrates through the lower wall such that, when the airbag in the inflated and expanded state receives a load toward the front in the seat front-rear direction, the protrusion portion interferes with the lower wall from forward thereof in the seat front-rear direction.

In this vehicle occupant protection device, when the airbag is subjected to a load toward the front in the seat front-rear direction in accordance with protection of the head of a vehicle occupant when there is, for example, a frontal collision, the protrusion portion provided at the inflator interferes with the lower wall of the upper portion of the seatback frame from forward thereof. A load (a reaction force) that the airbag receives is dispersed into the lower wall of the seatback frame via a region of interference between the protrusion portion and the lower wall. Thus, because the load from the airbag is dispersed into the upper wall and the lower wall of the seatback frame, local deformations of the seatback frame, the pipe portion and the protrusion portion are prevented or reduced.

In the present aspect, at least one of the pipe portion and the protrusion portion may be disposed between a pair of stay holders in the seat width direction, the pair of stay holders supporting stays of the headrest at the seatback frame, being spaced apart in the seat width direction, and being fixed to the upper portion of the seatback frame.

In this vehicle occupant protection device, a load from the airbag is dispersed into and braced at plural locations of the seatback frame that are separated in the width direction via the headrest, which is to say the stays and stay holders, the pipe portion and the protrusion portion. Because at least one of the pipe portion and the protrusion portion is disposed between the pair of stay holders in the seat width direction, the load from the airbag can be dispersed into the upper portion of the seatback frame in a well-balanced manner.

In the present aspect, the inflator may be disposed between opposing faces of the upper wall and the lower wall and is fixed to the fixing portion, the fixing portion being the lower wall or a connecting wall of the upper portion of the seatback frame, the connecting wall connecting the upper wall with the lower wall.

In this vehicle occupant protection device, the inflator is disposed between the opposing faces of the upper wall and lower wall of the upper portion of the seatback frame. That is, the inflator is disposed to effectively utilize a cavity formed in a structure that is for assuring stiffness of the seatback frame. Thus, a deterioration in functionality of the seatback due to the inflator is even more effectively reduced.

In the present aspect, the fluid communication structure may include a region disposed at the rear in the seat front-rear direction relative to the upper portion of the seatback frame such that, when the airbag in the inflated and expanded state receives a load toward the front in the seat front-rear direction, the region interferes with the upper portion from rearward thereof in the seat front-rear direction.

In this vehicle occupant protection device, when the airbag is subjected to a load toward the front in the seat front-rear direction in accordance with protection of the head of a vehicle occupant when there is, for example, a frontal collision, a region of the fluid communication structure that supplies the gas from the inflator to the airbag, which region is disposed behind the upper portion of the seatback frame, interferes with the upper portion from the rear thereof. A load (a reaction force) that the airbag receives is dispersed into the the seatback frame via the region of interference. Therefore, compared to a structure in which an inflator and an airbag are in fluid communication through a flexible fluid communication structure such as, for example, a resin tube or the like, the load received by the airbag may be efficiently braced by the seatback frame.

As described hereabove, in a vehicle occupant protection device according to the present disclosure, in a structure in which an airbag including a front inflation portion and a pair of side inflation portions is stowed in a headrest, deteriorations in designability of the headrest and functionality of a seatback caused by an inflator may be reduced.

BRIEF DESCRIPTION OF THE DRAWINGS

An exemplary embodiment of the present disclosure will be described in detail based on the following figures, wherein:

FIG. 1A is a magnified schematic side sectional diagram of principal portions of a vehicle occupant protection device in accordance with an exemplary embodiment in a usual state;

FIG. 1B is a side sectional diagram of the vehicle occupant protection device in accordance with the exemplary embodiment, illustrating a process of attachment of a headrest to a seatback;

DETAILED DESCRIPTION

First Exemplary Embodiment

Figure 1C:
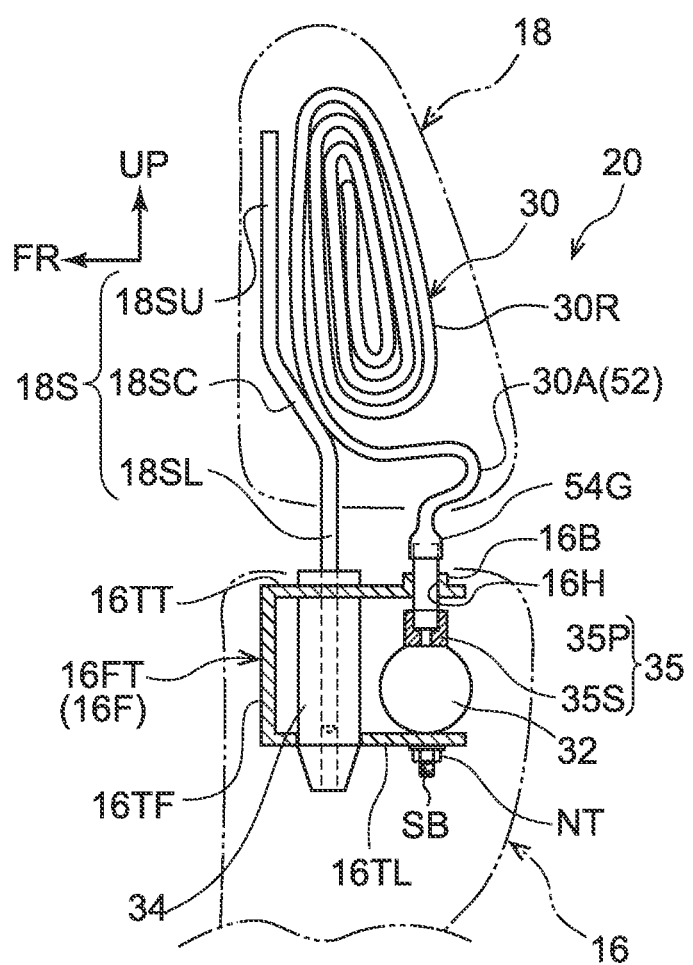
FIG. 1C is a side sectional diagram of the vehicle occupant protection device in accordance with the exemplary embodiment, illustrating a headrest height adjustment state.

A vehicle occupant protection device 10 according to the exemplary embodiment is described on the basis of FIG. 1A to FIG. 9. An arrow FR and an arrow UP that are marked in the drawings indicate a front direction (a direction in which a seat occupant faces) and an upper direction of a vehicle seat 12, respectively. Herebelow, where descriptions are given using the directions front, rear, up, down, left and right, unless particularly specified, these represent the front and rear in the seat front-rear direction, up and down in the seat vertical direction, and left and right when facing forward in the seat front-rear direction. An arrow IN that is marked in the drawings indicates a vehicle width direction center side of an automobile that serves as the vehicle in which the vehicle seat 12 is installed.

—Structure of the Vehicle Seat in which the Vehicle Occupant Protection Device is Installed—

As illustrated in FIG. 3 to FIG. 6B, the vehicle occupant protection device 10 is installed in the vehicle seat 12. The vehicle seat 12 is disposed to be offset to left or right (to the left side in the present exemplary embodiment) relative to the center in the vehicle width direction of the vehicle body of an automobile, which is not illustrated in the drawings. The seat front-rear direction of the vehicle seat 12 matches a front-rear direction of the vehicle, and a seat width direction of the vehicle seat 12 matches the vehicle width direction. The vehicle seat 12 includes a seat cushion 14, a seatback 16 of which a lower end is connected to a rear end of the seat cushion 14, and a headrest 18 that is attached to an upper end of the seatback 16.

FIG. 3, FIG. 4, FIG. 6A, FIG. 6B and so forth illustrate a state in which a crash test dummy (a mannequin) that serves as a model of a vehicle occupant who is to be protected by the vehicle occupant protection device 10 is seated on the seat cushion 14 of the vehicle seat 12. The dummy D is, for example, a World Side Impact Dummy (WorldSID) AM50 dummy (representing the 50th percentile of American adult males). The dummy D is seated in a standard sitting attitude designated for impact testing, and the vehicle seat 12 is disposed at a standard specified position corresponding to this sitting attitude. Below, in order to facilitate understanding of the descriptions, the dummy D is referred to as "the seat occupant D".

Figure 2:
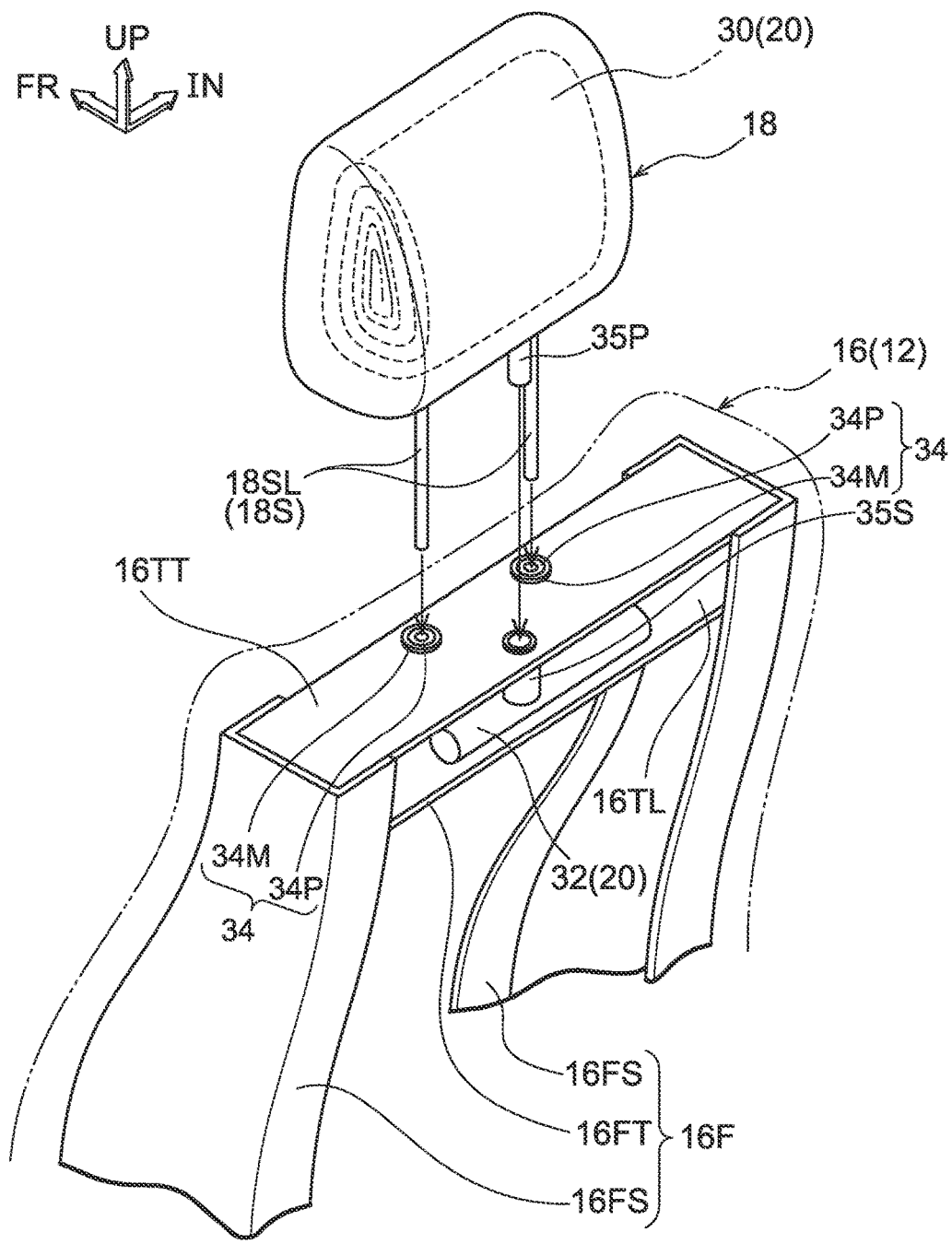
FIG. 2 is a perspective view schematically illustrating principal portions of the vehicle occupant protection device in accordance with the exemplary embodiment.

As illustrated in FIG. 2, the seatback 16 is structured by a cushion material, a cover material and the like, which are not illustrated in the drawings, being assembled to a seatback frame 16F that serves as a framework member. The seatback frame 16F includes a left and right pair of side frames 16FS and a top frame 16FT that spans between upper ends of the pair of side frames 16FS. The top frame 16FT corresponds to the "upper portion of the seatback frame" of the present disclosure. The top frame 16FT extends in the seat width direction.

As illustrated in FIG. 1A to FIG. 1C, the top frame 16FT is formed in a "C" shape (a "U" shape) that opens toward the rear in a side sectional view. The top frame 16FT includes an upper wall 16TT and a lower wall 16TL that oppose one another from above and below, and a front wall 16TF that serves as a connecting wall connecting front ends of the upper wall 16TT and lower wall 16TL with one another.

Figure 3:
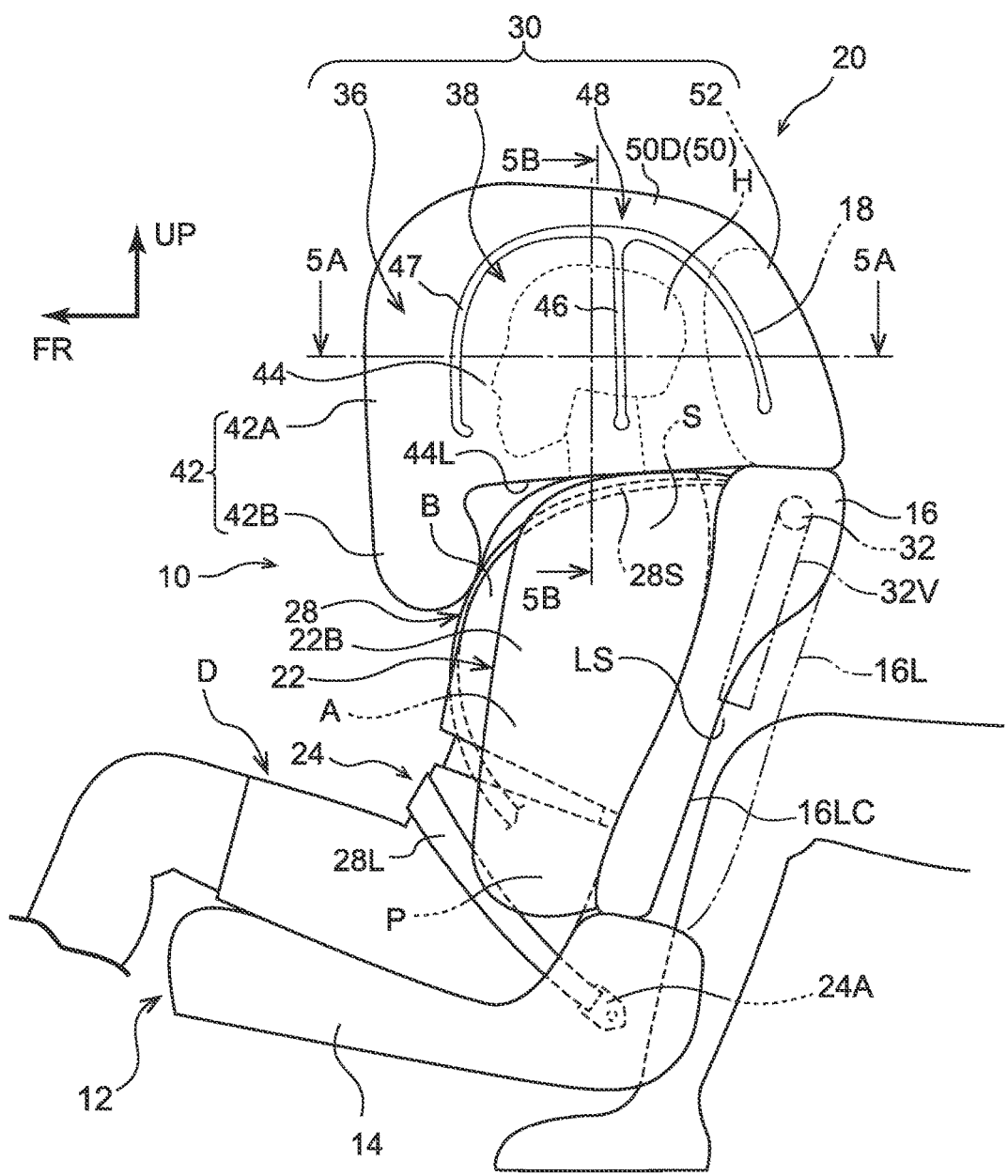
FIG. 3 is a side view schematically illustrating an activated state of the vehicle occupant protection device in accordance with the exemplary embodiment.

In FIG. 3, a rear edge 16L in a side view of the seatback 16 is illustrated by an imaginary line, and a rear edge 16LC of a seat width direction central portion of the seatback 16 is illustrated by a solid line. As illustrated in FIG. 3, the rear edge 16LC at the seat width direction central portion of the seatback 16 is disposed to forward relative to the rear edge 16L at seat width direction end portions of the seatback 16, except at a portion at the upper end side of the seatback 16. Thus, a leg space LS for (the legs L of) a rear seat occupant is formed at the rear face side of the seatback 16.

As illustrated in FIG. 1A to FIG. 1C and FIG. 2, the headrest 18 is attached to the seatback frame 16F of the seatback 16 via headrest stays 18S that serve as stays. A lower portion 18SL of each headrest stay 18S is supported at a stay holder 34, which is described below, an upper portion 18SU of the headrest stay 18S is disposed to forward relative to the lower portion 18SL, and the lower portion 18SL and upper portion 18SU are connected via an inclined central portion 18SC.

The headrest stays 18S are supported at the seatback frame 16F via a left and right pair of the stay holders 34, which are fixed to the top frame 16FT of the seatback frame 16F. As illustrated by the partial section in FIG. 1A, principal portions of the structure of each stay holder 34 are a holder main body 34M formed of a pipe fabricated of metal and a guide pipe 34P fabricated of resin. The guide pipe 34P is inserted into the holder main body 34M in a retained condition. In this exemplary embodiment, the holder main body 34M penetrates through the upper wall 16TT and the lower wall 16TL at a front portion of the top frame 16FT and is fixed to the upper wall 16TT and lower wall 16TL in this state.

The lower portion 18SL of each headrest stay 18S is inserted into the guide pipe 34P of the stay holder 34 to be slidable in the vertical direction and anchorable (lockable) at predetermined positions. A position of the headrest 18 in the vertical direction relative to the seatback 16 can be adjusted by sliding of the headrest stays 18S relative to the stay holders 34.

—Schematic Overall Structure of the Vehicle Occupant Protection Device—

As illustrated in FIG. 3 to FIG. 6B, the vehicle occupant protection device 10 is equipped with a multidirectional airbag device 20 for protecting the seat occupant D from various modes of impact, a side airbag device 22 and a seatbelt device 24. Below, general structures of the seatbelt device 24 and the side airbag device 22 are described, after which detailed structure of the multidirectional airbag device 20 is described.

The seatbelt device 24 is a three-point seatbelt device: one end of a belt (a webbing) 28 is unwindably taken up onto a retractor 26 and another end of the belt 28 is fixed to an anchor 24A. A tongue plate 24T is slidably provided on the belt 28. The belt 28 is applied to the seat occupant D by this tongue plate 24T being engaged with a buckle 24B. In the state in which the belt 28 is applied to the seat occupant D, a shoulder belt 28S of the belt 28 from the retractor 26 to the tongue plate 24T is applied to the upper body of the seat occupant D, and a lap belt 28L from the tongue plate 24T to the anchor 24A is applied to a pelvis area P of the seat occupant D.

In this exemplary embodiment, the retractor 26, the anchor 24A and the buckle 24B of the seatbelt device 24 are provided at the vehicle seat 12, structuring what is known as a seat-mounted seatbelt device. In this exemplary embodiment, the retractor 26 features a pre-tensioner function that forcibly takes up the belt 28 when activated. The pre-tensioner function of the retractor 26 is activated by an ECU 60, which is described below.

The side airbag device 22 is provided with an inflator 22A and a side airbag 22B. The side airbag 22B is stowed in a folded state thereof in a side portion at the vehicle width direction outer side of the seatback 16. The inflator 22A generates gas inside the side airbag 22B when activated. The side airbag 22B is inflated and expanded at the vehicle width direction outer side relative to the seat occupant D by this gas, protruding forward from the side portion of the seatback 16. In this exemplary embodiment, the side airbag 22B is structured to inflate and expand at the vehicle width direction outer side relative to the pelvis area P, an abdomen area A, a breast area B and a shoulder area S of the seat occupant D.

—Structure of the Multidirectional Airbag Device—

As illustrated in FIG. 1A to FIG. 1C, the multidirectional airbag device 20 includes a multidirectional airbag 30 that serves as an airbag, an inflator 32, and a coupler 35 that serves as a fluid communication structure communicating between the inflator 32 and the multidirectional airbag 30 to enable a flow of gas. As described in detail below, the multidirectional airbag 30 is stowed in a folded state thereof in the headrest 18, and the inflator 32 is fixed to the top frame 16FT of the seatback frame 16F. Concrete descriptions are given below.

Multidirectional Airbag

—Inflated and Expanded State and Flat Pattern—

As illustrated in the plan sectional view in FIG. 5A, the multidirectional airbag 30 is structured as a single bag body that inflates and expands so as to surround the head area H (which may below be referred to simply as "the head H") of the seat occupant D from the front and both left and right sides. In more specific terms, as illustrated in FIG. 3 to FIG. 5B, the multidirectional airbag 30 includes a front expansion portion 36 that inflates and expands forward of the head H and a left and right pair of side expansion portions 38 that inflate and expand at both the left and right sides of the head H.

The front expansion portion 36 includes a mesh portion 40 and a front inflation portion 42. The mesh portion 40 is a view-enabling structure that expands at the front face of the head H. The front inflation portion 42 inflates and expands to surround the mesh portion 40 in a front view. The mesh portion 40 is formed in a substantially rectangular shape in front view. The front inflation portion 42 is formed in a rectangular frame shape, inner periphery edges of which are joined to the mesh portion 40. The front inflation portion 42 receives a supply of gas and inflates and expands.

Figure 4:
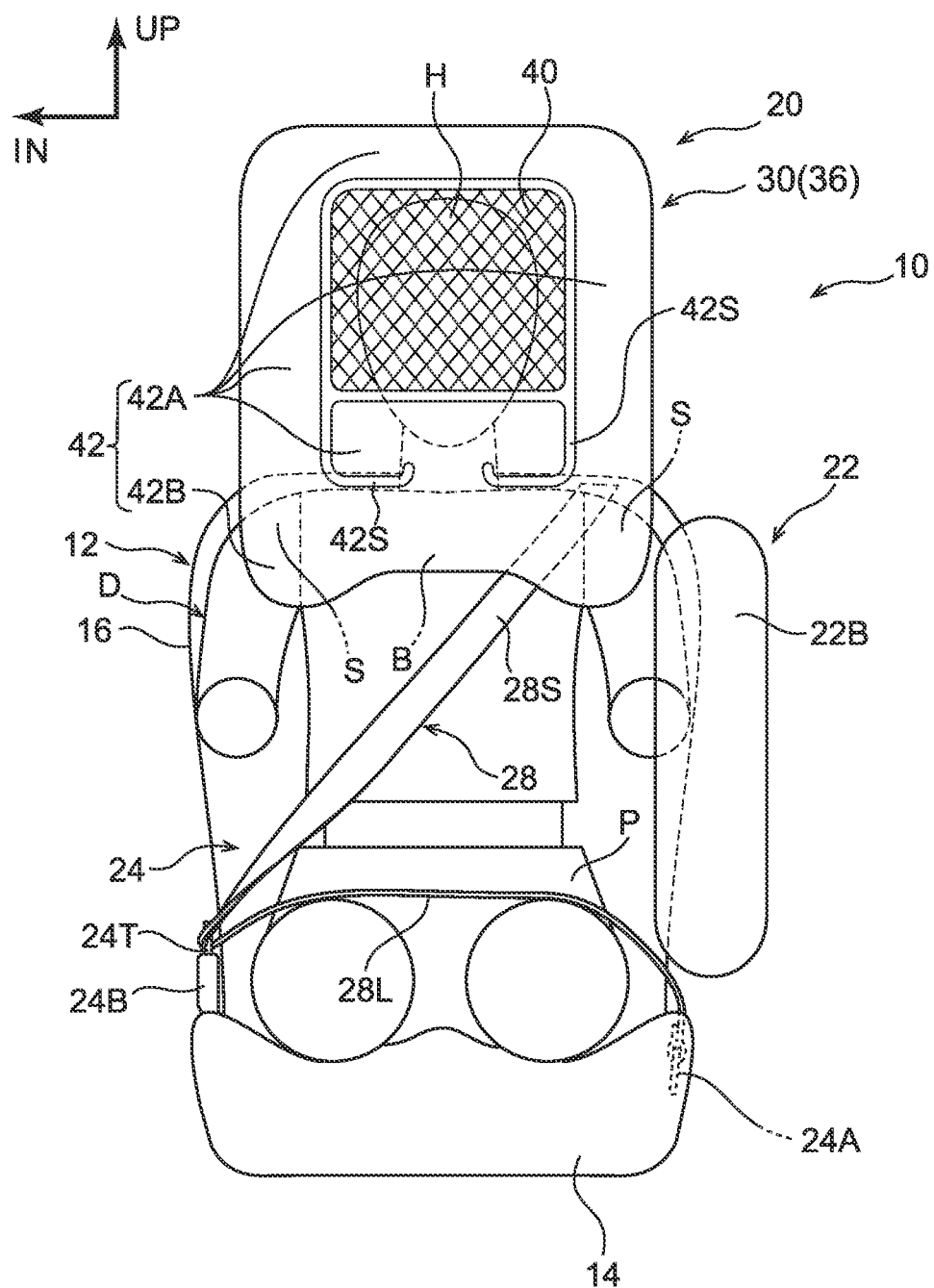
FIG. 4 is a front view schematically illustrating the activated state of the vehicle occupant protection device in accordance with the exemplary embodiment.
Figure 5A:
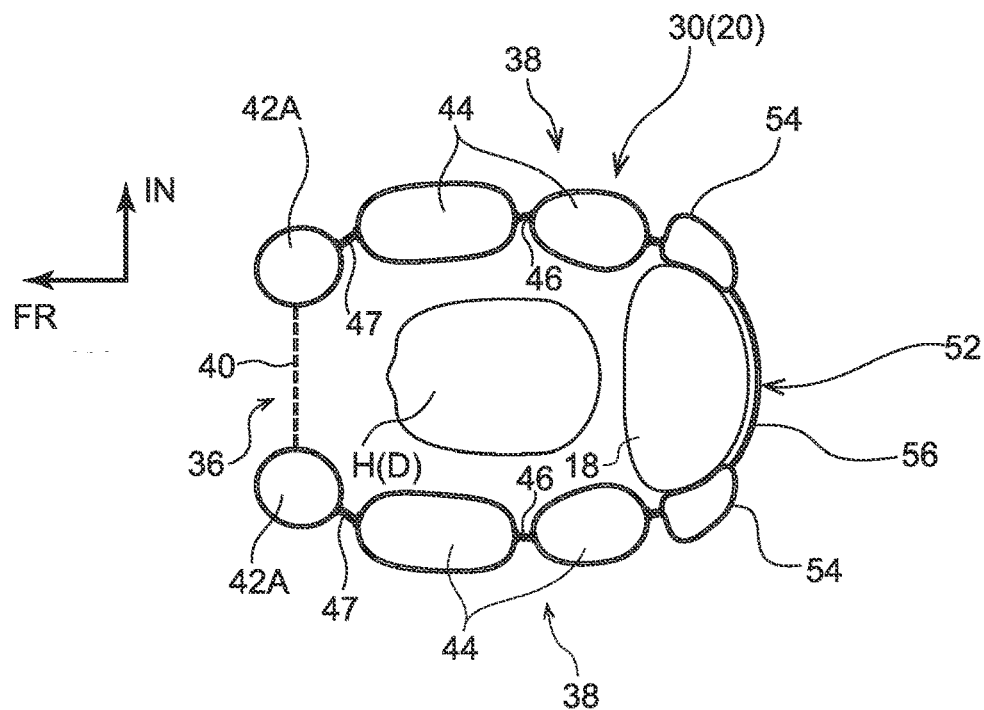
FIG. 5A is a diagram illustrating an inflated and expanded state of a multidirectional airbag that structures the vehicle occupant protection device in accordance with the exemplary embodiment, which is a sectional diagram cut along line 5A-5A in FIG. 3.

As illustrated in FIG. 4, regions of the front inflation portion 42 that are generally higher than the seatback 16 and surround the mesh portion 40 serve as a first inflation portion 42A that inflates and expands to forward of the head H. Regions of the front inflation portion 42 that are disposed below the first inflation portion 42A (i.e., that overlap with the seatback 16 in front view) serve as a second inflation portion 42B, which is an upper body restraining portion that inflates and expands forward of the breast area B, shoulder area S and head H of the seat occupant D. The second inflation portion 42B is supplied with gas via the first inflation portion 42A. In this exemplary embodiment, regions of the first inflation portion 42A that are disposed lower than the mesh portion 40 are partitioned from other regions of the first inflation portion 42A and are supplied with gas via the second inflation portion 42B.

Each side expansion portion 38 includes a side inflation portion 44 and a seam portion 46. The side inflation portion 44 receives a supply of gas and inflates and expands at the side of the head H. The seam portion 46 is a non-inflating portion that extends in the vertical direction and partitions the side inflation portion 44 into front and rear. As illustrated in FIG. 3, the side inflation portion 44 has a size (area) that overlaps with the whole of the head H in side view. The seam portion 46 partitions the side inflation portion 44 into front and rear at a region of the side inflation portion 44 that overlaps with the head H.

Respective front ends of the left and right side inflation portions 44 are linked in fluid communication states to corresponding lower ends of the first inflation portion 42A at the left and right of the front inflation portion 42 (to vicinities of boundaries between the first inflation portion 42A and the second inflation portion 42B). Thus, the left and right side inflation portions 44 can be supplied with gas from the inflator 32 via the front inflation portion 42. Regions between the first inflation portion 42A of the front inflation portion 42 and the side inflation portions 44 above these fluid communication regions are set apart by seam portions 47.

Figure 5B:
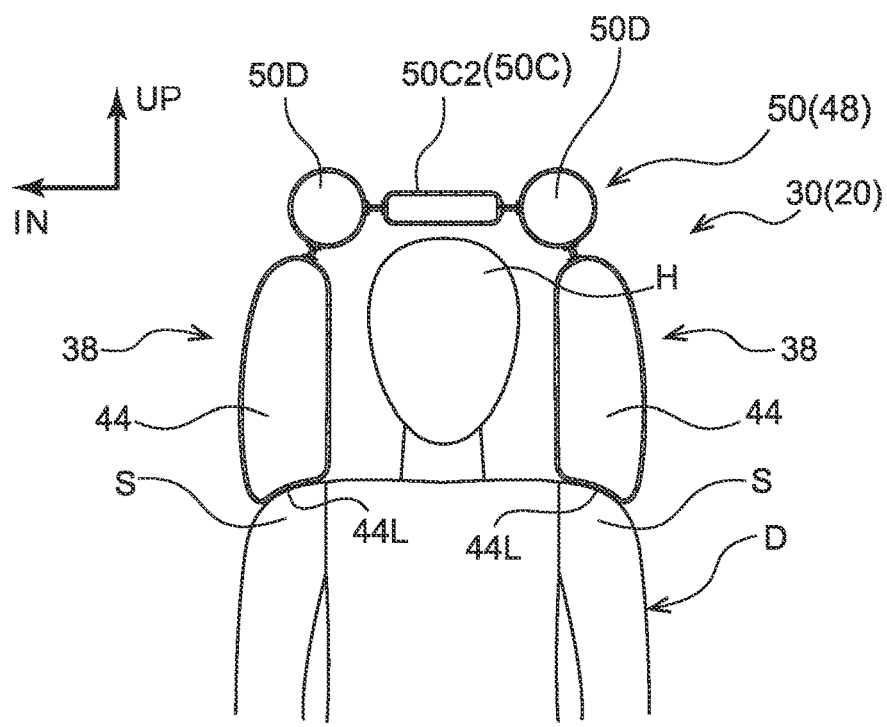
FIG. 5B is a diagram illustrating the inflated and expanded state of the multidirectional airbag that structures the vehicle occupant protection device in accordance with the exemplary embodiment, which is a sectional diagram cut along line 5B-5B in FIG. 3.

As illustrated in FIG. 5B, the left and right side expansion portions 38 are formed such that, in a completely inflated and expanded state of the multidirectional airbag 30, respective lower ends 44L of the side inflation portions 44 touch onto the shoulder area S of the seat occupant D. In this structure, a position in the vertical direction of the multidirectional airbag 30 relative to (the head H of) the seat occupant in the completely inflated and expanded state is determined by the lower ends 44L of the side inflation portions 44 touching against the shoulder area S.

In this positioned condition, none of the front expansion portion 36, the left and right side expansion portions 38 and an upper expansion portion 48 that is described below of the multidirectional airbag 30 touch against the head H of a seat occupant D who is sitting in a usual sitting attitude (gaps are formed between the multidirectional airbag 30 and the head H).

As illustrated in FIG. 3, the multidirectional airbag 30 includes the upper expansion portion 48, which is joined to upper edges of the front expansion portion 36 and the left and right side expansion portions 38 and expands above the head H of the seat occupant D. A principal portion structuring the upper expansion portion 48 is an upper inflation portion 50 that receives a supply of gas and inflates and expands. As illustrated in FIG. 5B, the upper inflation portion 50 includes a central inflation portion 50C and a pair of upper duct portions 50D. The central inflation portion 50C inflates and expands above the head H. The upper duct portions 50D are structured as duct portions that extend in the front-rear direction at the left and right of the central inflation portion 50C.

Figure 8:
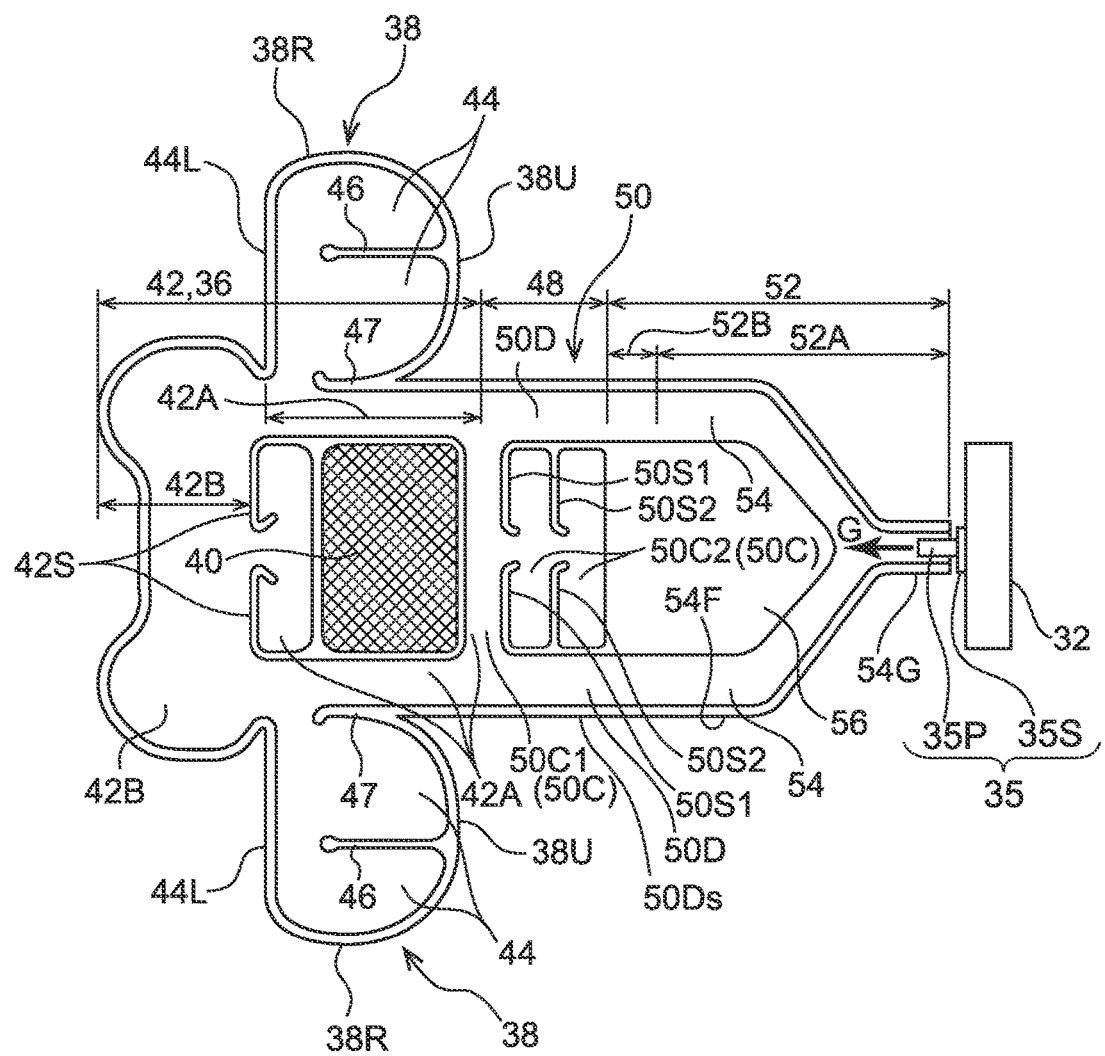
FIG. 8 is a diagram illustrating a flat pattern of the multidirectional airbag structuring the vehicle occupant protection device in accordance with the exemplary embodiment.

As illustrated by the flat pattern in FIG. 8, the central inflation portion 50C includes an inflation portion 50C1 and an inflation portion 50C2. The inflation portion 50C1 is shared with a region structuring an upper edge of the front inflation portion 42. The inflation portion 50C2 is partitioned from the inflation portion 50C1 by a seam portion 50S1 such that gas can flow therebetween. The inflation portion 50C2 is partitioned into front and rear by a seam portion 50S2 such that gas can flow therebetween. Both left and right ends of the inflation portion 50C1 are in fluid communication with the upper duct portions 50D. A seat width direction central portion of a rear edge of the inflation portion 50C1 is in fluid communication with the inflation portion 50C2. Front ends of the left and right upper duct portions 50D are in fluid communication with each of left and right edges of the upper edge of the front inflation portion 42.

The multidirectional airbag 30 includes a rear expansion portion 52 that expands at the rear of the upper expansion portion 48. The rear expansion portion 52 includes rear duct portions 54, which are inflation portions, and a non-inflating portion 56. The rear duct portions 54 are divided between left and right and respective upper ends thereof are linked in fluid communication states with the corresponding left and right upper duct portions 50D. Front edges of the left and right rear duct portions 54 are joined to a rear edge of the central inflation portion 50C, and are connected with one another by the non-inflating portion 56.

The left and right rear duct portions 54 form a flow junction with one another below the non-inflating portion 56, forming a pentagonal shape (see FIG. 8), and forming a gas entry portion 54G. A plug portion 35P of the coupler 35, which is described below, is connected to the gas entry portion 54G in an airtight condition.

The rear expansion portion 52 described above may be divided into a proximal portion 52A that inflates and expands at the rear of the headrest 18 and a connecting portion 52B that inflates and expands above the headrest 18 (see the flat pattern in FIG. 8). The proximal portion 52A is supported at the seatback 16 via the coupler 35 that is described below. The connecting portion 52B links the proximal portion 52A with the upper expansion portion 48 in a fluid communication state.

In a non-restraining inflated and expanded state of the multidirectional airbag 30 in which no seat occupant D is restrained, as illustrated in FIG. 3, the multidirectional airbag 30 has a structure that does not coincide (overlap) in side view with the side airbag 22B in a non-restraining inflated and expanded state thereof in which no seat occupant D is restrained. In other words, the multidirectional airbag 30 and the side airbag 22B are structured so as not to include inflated and expanded portions that overlap with one another in the respective non-restraining inflated and expanded states thereof, at least in side view. Moreover, as illustrated in FIG. 4, the multidirectional airbag 30 in the non-restraining inflated and expanded state does not coincide in front view with the side airbag 22B in the non-restraining inflated and expanded state in which no seat occupant D is restrained.

Before being folded, the multidirectional airbag 30 that inflates and expands as described above is formed in an expanded shape (a flat pattern) as illustrated in FIG. 8. The multidirectional airbag 30 with this expanded shape is formed as a single bag body by an OPW (one-piece woven) technique. The multidirectional airbag 30 may also be formed as a single bag body by a technique in which periphery edges of two fabrics are sewn together (cut and sew).

From the condition illustrated in FIG. 8, upper edges 38U of the side expansion portions 38 of the multidirectional airbag 30 are joined by sewing or the like to side edges 50Ds of the upper duct portions 50D, and rear edges 38R of the side expansion portions 38 are joined by sewing or the like to front edges 54F (the upper and lower edges in the drawing of FIG. 8) of the rear duct portions 54. In this joined state, the multidirectional airbag 30 is folded up and stowed in the headrest 18. A folding mode of the multidirectional airbag 30 is described below.

—Folding Mode and State of Stowing in the Headrest—

As illustrated in FIG. 1A to FIG. 1C and FIG. 7, the multidirectional airbag 30 is stowed in the headrest 18 in a state in which the multidirectional airbag 30 is folded in an outside roll shape (outside roll folding). The multidirectional airbag 30 in this folded state is disposed to the rear of the upper portions 18SU and central portions 18SC of the headrest stays 18S of the headrest 18.

Figure 7:
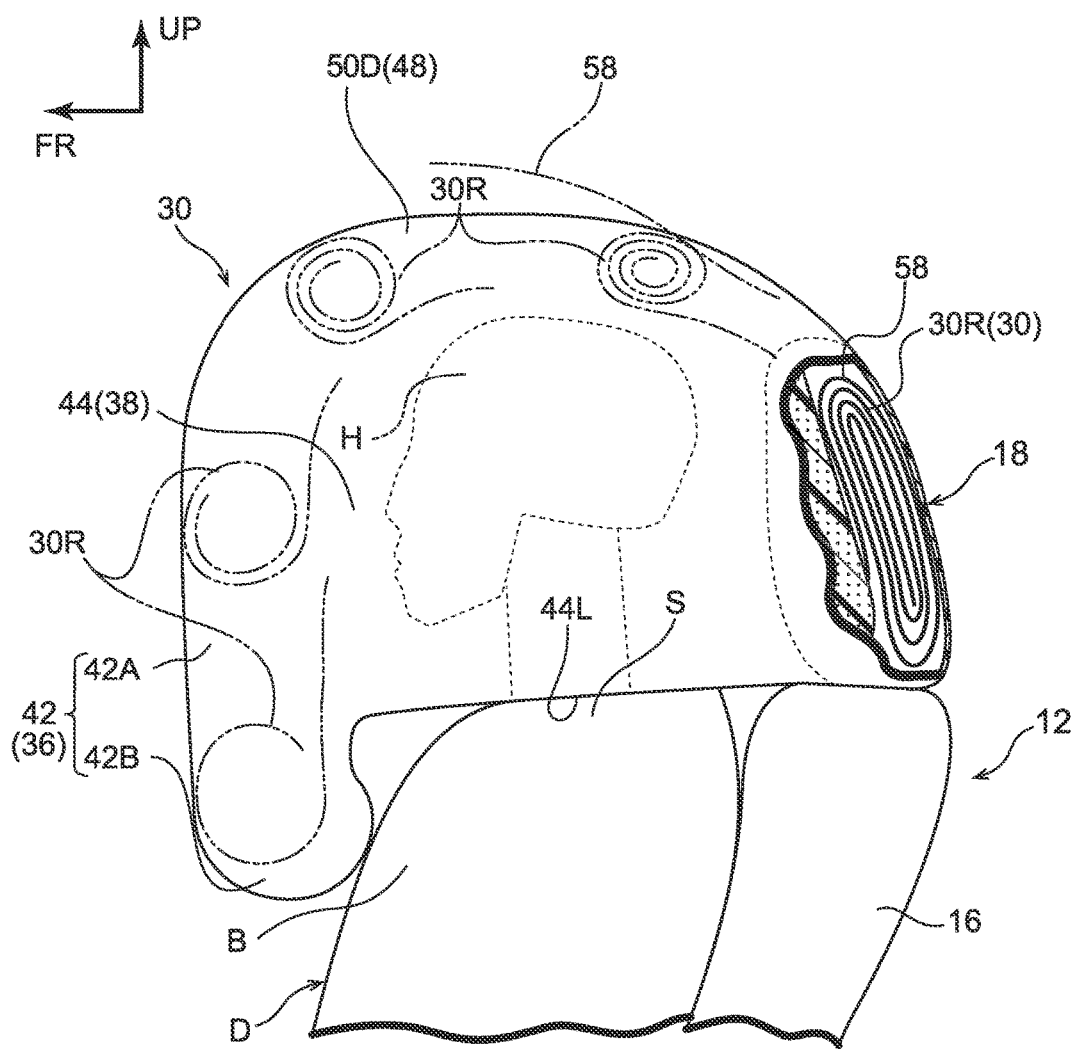
FIG. 7 is a schematic magnified side view that is illustrated partially cut away for description of an inflation and expansion process of the multidirectional airbag structuring the vehicle occupant protection device in accordance with the exemplary embodiment.

The term "outside roll folding" used here refers to a mode of folding into a roll from the front end side toward the upper side and the rear side, so as to fold the opposite way to the expansion process illustrated in FIG. 7. That is, outside roll folding is a folding mode in which a roll portion 30R is disposed at the outer side of the multidirectional airbag 30 during the expansion process of the multidirectional airbag 30 (i.e., at the opposite side of the multidirectional airbag 30 from the head H), as illustrated by the imaginary lines in FIG. 7. The multidirectional airbag 30 in which the side expansion portions 38 are sewn to the upper expansion portion 48 and the rear expansion portion 52 as described above is folded with the side expansion portions 38 inside the roll at the stage at which the front expansion portion 36 and upper expansion portion 48 are being outside roll-folded.

As illustrated in FIG. 7, an expansion guide cloth 58 is folded up together with the multidirectional airbag 30 and stowed inside the headrest 18. The expansion guide cloth 58 is not illustrated in the drawings of FIG. 1A to FIG. 1C. Although not illustrated in the drawings, a proximal portion of the expansion guide cloth 58 that is disposed at the outer side relative to the multidirectional airbag 30 that has been folded as described above is connected to a region at the gas entry portion 54G side of the multidirectional airbag 30, which is a region at a proximal end side of the multidirectional airbag 30. A distal end side of the expansion guide cloth 58 is disposed at the inner side (the headrest 18 side) of the roll portion 30R such that the expansion guide cloth 58 covers the roll portion 30R of the multidirectional airbag 30 in the opposite direction (the counterclockwise direction in FIG. 7) to the roll direction (the clockwise direction in FIG. 7).

In accordance with inflation and expansion (unrolling of the roll) of the multidirectional airbag 30 as illustrated by the imaginary lines in FIG. 7, the expansion guide cloth 58 is guided out of the headrest 18 and expands to precede the multidirectional airbag 30, between the multidirectional airbag 30 and a ceiling of the vehicle cabin. The expansion guide cloth 58 has a lower friction coefficient against the multidirectional airbag 30 than would a ceiling material of the automobile in which the vehicle occupant protection device 10 is employed. In this exemplary embodiment, the vehicle cabin ceiling side of the expansion guide cloth 58 is treated with a silicon coating but the surface of the expansion guide cloth 58 that is in contact with the multidirectional airbag 30 is a low friction surface that is not treated with a silicon coating.

Figure 6A:
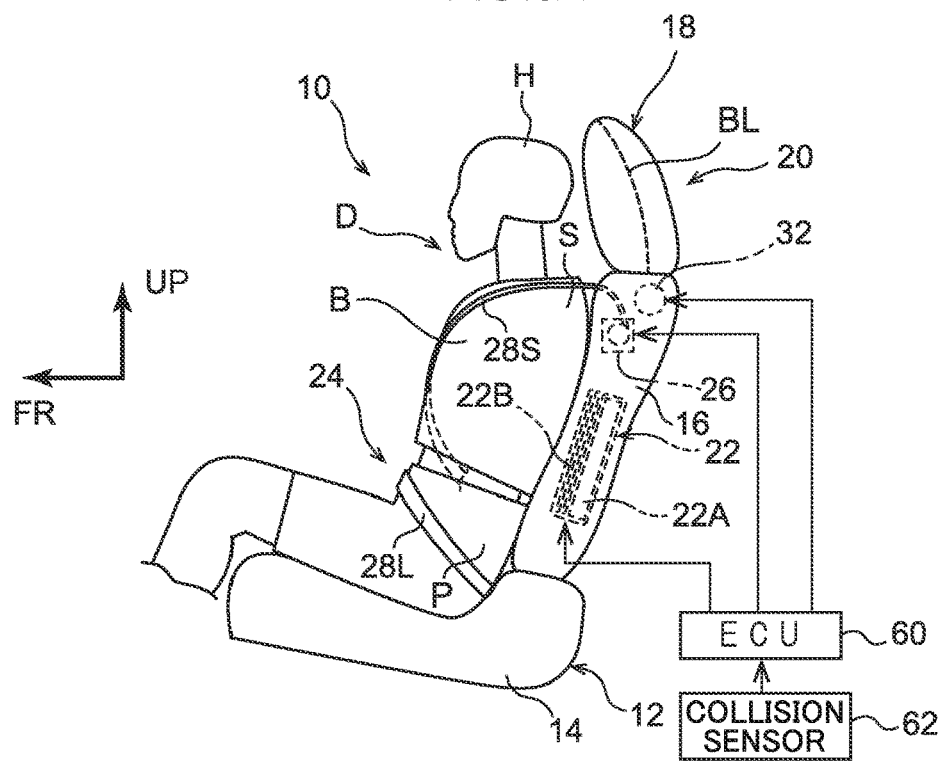
FIG. 6A is a side view illustrating schematic overall structure before activation of the vehicle occupant protection device in accordance with the exemplary embodiment.
Figure 6B:
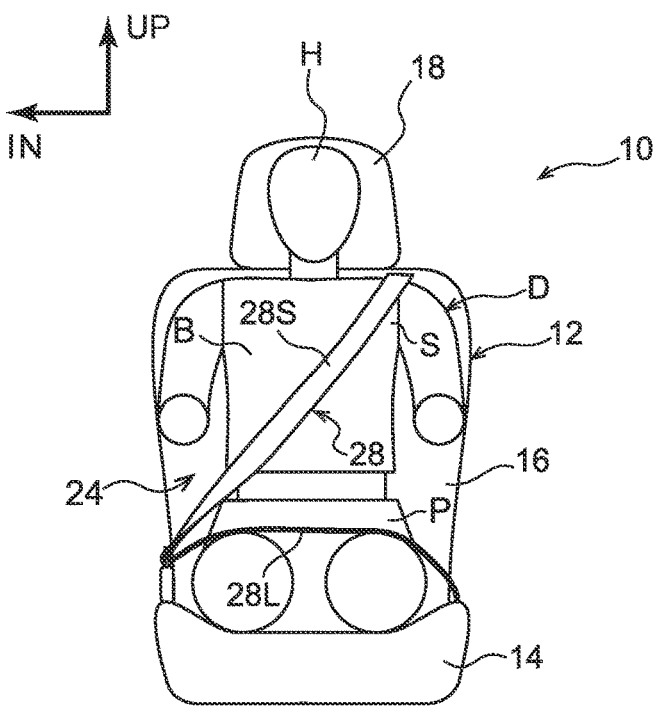
FIG. 6B is a front view illustrating the schematic overall structure before activation of the vehicle occupant protection device in accordance with the exemplary embodiment.

As illustrated in FIG. 6A, a burst line BL is formed in the headrest 18 so as to divide the cover material of the headrest 18 between front and rear. The burst line BL of the headrest 18 is ruptured by expansion pressure of the multidirectional airbag 30. Thus, a structure is formed in which the inflation and expansion of the multidirectional airbag 30 toward the front is allowed.

Inflator

The inflator 32 that is employed is an ignition-type or cold gas-type inflator. When activated, the inflator 32 supplies generated gas into the multidirectional airbag 30. In this exemplary embodiment, the inflator 32 is a cylinder-shaped inflator that is longest in an axial direction thereof. Activation of the inflator 32 is controlled by the ECU 60, which is described below and serves as a control device.

As mentioned above, the inflator 32 is fixed to the top frame 16FT of the seatback frame 16F. In specific terms, as illustrated in FIG. 1A to FIG. 1C and FIG. 2, the inflator 32 is disposed in an attitude with the long dimension thereof in the seat width direction, between opposing faces of the upper wall 16TT and lower wall 16TL structuring the top frame 16FT, and is fixed to the lower wall 16TL. In this exemplary embodiment, the inflator 32 is deposed to the rear relative to the stay holders 34.

Stud bolts SB protrude from plural locations (for example, two locations) separated in the length direction of the inflator 32. The inflator 32 is fixed to the top frame 16FT by nuts NT being screwed onto the stud bolts SB in a state in which the stud bolts SB penetrate through the lower wall 16TL. That is, the stud bolts SB penetrate (are inserted) through through-holes formed in the lower wall 16TL, which are not illustrated in the drawings. The stud bolts SB correspond to a "protrusion portion" that penetrates through a lower wall of the present disclosure. The lower wall 16TL in this exemplary embodiment corresponds to a "fixing portion" of the present disclosure. The structure in which a plural number of the stud bolts SB are provided is not limiting; there may be only one stud bolt SB.

Coupler

As described above, the inflator 32 and the multidirectional airbag 30 are connected to allow flows of gas via the coupler 35, which serves as the fluid communication structure. Principal portions structuring the coupler 35 are a socket portion 35S, which is fabricated of metal and fixed to the inflator 32, and the plug portion 35P, which is fabricated of metal and connected to the socket portion 35S.

The socket portion 35S is formed in a pipe shape. In the state in which the inflator 32 is fixed to the top frame 16FT as described above, the socket portion 35S opens into a central portion in the length direction of the inflator 32 to serve as a jetting-out aperture, through which the gas jets out upward. That is, the coupler 35 of this exemplary embodiment is disposed between the pair of stay holders 34 in the seat width direction. In this exemplary embodiment, the pair of stay holders 34 and the single coupler 35 are disposed equidistantly in the seat width direction.

The plug portion 35P is also formed in a pipe shape. In a state in which one end of the plug portion 35P is inserted into the gas entry portion 54G of the multidirectional airbag 30, the plug portion 35P is connected to (the proximal portion 52A of) the multidirectional airbag 30 in an airtight condition. The other end of the plug portion 35P is connected to the socket portion 35S by a movement in an axial direction thereof (a vertical direction). In this connected state, the other end of the plug portion 35P is locked to the socket portion 35S in an anchored state by a locking mechanism, which is not illustrated in the drawings.

In this connected state, the plug portion 35P penetrates through the upper wall 16TT of the top frame 16FT. In specific terms, the plug portion 35P penetrates (is inserted) through a penetrating hole 16H formed in the upper wall 16TT. A boss portion 16B in a short tubular shape is formed around the penetrating hole 16H by a burring process. A gap between the boss portion 16B and the plug portion 35P is specified such that the same interfere if a load of at least a predetermined value is applied to the plug portion 35P from the multidirectional airbag 30. In specific terms, if the front expansion portion 36 of the multidirectional airbag 30 is subjected to a load toward the front by the head H of the seat occupant D during a frontal collision or the like, the plug portion 35P interferes with the boss portion 16B. In this exemplary embodiment, the plug portion 35P may be understood as corresponding to a pipe portion of the present disclosure, and the whole of the coupler 35 including the plug portion 35P may also be understood as corresponding to the pipe portion. Furthermore, the plug portion 35P of this exemplary embodiment corresponds to a "region disposed at the rear in the seat front-rear direction relative to the upper portion of the seatback frame" of the present disclosure.

According to the structure described above, the plug portion 35P is connected to the socket portion 35S in association with an operation of inserting the headrest stays 18S into the stay holders 34. In other words, as illustrated in FIG. 1B, this is a structure in which the multidirectional airbag 30 and inflator 32 are connected via the coupler 35 to allow flows of gas (in fluid communication) in association with an operation of attaching the headrest 18 in which the multidirectional airbag 30 has been stowed to the seatback 16.

The multidirectional airbag 30 in the folded state is provided with a folding portion 30A, which serves as an allowing portion that allows vertical movements (changes of position in the vertical direction) of the headrest stays 18S relative to the stay holders 34, that is, height adjustments of the headrest 18. In this exemplary embodiment, the folding portion 30A is provided by folding upper and lower portions of the rear expansion portion 52 (folding the rear expansion portion 52 back and forth). A portion of the folding of the folding portion 30A is unfolded in association with sliding of the headrest stays 18S relative to the stay holders 34. Thus, height adjustment of the headrest 18 as illustrated in FIG. 1C from the low position state illustrated in FIG. 1A is enabled. A bellows cover or the like that prevents exposure of the multidirectional airbag 30 in the state illustrated in FIG. 1C may be provided extending between the headrest 18 and the seatback 16.

—Configuration of ECU—

As illustrated in FIG. 6A, the multidirectional airbag device 20, the side airbag device 22 and the seatbelt device 24 structuring the vehicle occupant protection device 10 are controlled by the ECU 60 that serves as the control device. To be specific, the inflator 32 of the multidirectional airbag device 20, the inflator 22A of the side airbag device 22, and the retractor 26 of the seatbelt device 24 (the pre-tensioner function) are each electronically connected to the ECU 60. The ECU 60 is also electronically connected to a collision sensor 62 (or sensor group).

On the basis of information from the collision sensor 62, the ECU 60 may detect or predict (an occurrence of or unavoidability of) a frontal collision against the automobile in which the ECU 60 is employed, for each of collision modes which are described below. The ECU 60 may also detect or predict, on the basis of information from the collision sensor 62, (an occurrence of or unavoidability of) a side collision against the vehicle in which the ECU 60 is employed.

When the ECU 60 detects or predicts a side collision on the basis of information from the collision sensor 62, the ECU 60 activates the inflators 22A and 32. When the ECU 60 detects or predicts a frontal collision on the basis of information from the collision sensor 62, the ECU 60 activates the inflator 32 and the retractor 26. Modes of frontal collision in which the ECU 60 activates the inflator 32 and the retractor 26 include a full overlap frontal collision and an offset frontal collision.

When the ECU 60 detects or predicts, on the basis of information from the collision sensor 62, a frontal collision that is a frontal collision against a position that is offset by more than a predetermined amount to one side in the vehicle width direction, the ECU 60 activates the inflators 22A and 32 and the retractor 26. Such frontal collisions against positions that are offset by at least a predetermined amount to one side in the vehicle width direction include oblique collisions, small overlap collisions and the like.

Here, the meaning of the term "oblique collision" (an Moving Deformable Barrier (MDB) impact or an oblique impact) includes, for example, a diagonal collision from the front as defined by the National Highway Traffic Safety Administration (NHTSA) (for example, a collision at a relative angle of 15° with the other party of the collision and an overlap amount of around 35% in the vehicle width direction). In this exemplary embodiment, the relative speed of an oblique collision is assumed to be, as an example, 90 km/h. The meaning of the term "small overlap collision" includes a frontal collision of an automobile that is, for example, a collision defined by the Insurance Institute for Highway Safety (IIHS) in which an overlap amount in the vehicle width direction with the other party of the collision is no more than 25%. For example, an impact against the vehicle width direction outer side relative to a front side member, which is a vehicle body framework member, corresponds to the term "small overlap collision". In this exemplary embodiment, the relative speed of a small overlap collision is assumed to be, as an example, 64 km/h.

Operation and Effects

Now, operation of the exemplary embodiment is described. First, seat occupant protection operations in response to various collision modes are described, and then operational effects according to the disposition of the inflator 32 and the like are described.

In the vehicle occupant protection device 10 with the structure described above, after the ECU 60 detects or predicts a side collision on the basis of information from the collision sensor 62, the ECU 60 activates the inflators 22A and 32. Accordingly, as illustrated in FIG. 3 and FIG. 4, the side airbag 22B of the side airbag device 22 inflates and expands at the outer side in the vehicle width direction relative to the seat occupant D, in addition to which the multidirectional airbag 30 of the multidirectional airbag device 20 inflates and expands so as to surround the head H of the seat occupant D.

Therefore, the shoulder area S, breast area B and abdomen area A of the seat occupant D are restrained from sideward by the side airbag 22B, and the head H is restrained from sideward principally by the side expansion portion 38 of the multidirectional airbag 30. Thus, the seat occupant D is protected against the side collision.

When the ECU 60 detects or predicts a frontal collision on the basis of information from the collision sensor 62, the ECU 60 activates the inflator 32 and the retractor 26. Accordingly, the belt 28 of the seatbelt device 24 is forcibly taken up by the retractor 26, and the multidirectional airbag 30 of the multidirectional airbag device 20 inflates and expands so as to surround the head H of the seat occupant D.

Therefore, the upper body of the seat occupant D is restrained by the belt 28, and the head H and breast area B of the seat occupant D are restrained from forward principally by the front expansion portion 36 of the multidirectional airbag 30. Thus, the seat occupant D is protected against the frontal collision.

When the ECU 60 detects or predicts an oblique collision on the basis of information from the collision sensor 62, the ECU 60 activates the inflators 22A and 32 and the retractor 26. Accordingly, the belt 28 of the seatbelt device 24 is forcibly taken up by the retractor 26, and the multidirectional airbag 30 of the multidirectional airbag device 20 inflates and expands so as to surround the head H of the seat occupant D. In addition, the side airbag 22B of the side airbag device 22 inflates and expands at the outer side in the vehicle width direction relative to the seat occupant D.

Therefore, the shoulder area S, breast area B and abdomen area A of the seat occupant D are restrained from sideward by the side airbag 22B, the upper body of the seat occupant D is restrained by the belt 28, and the head H and breast area B are restrained from forward and sideward by at least one of the front expansion portion 36 and the side expansion portion 38 of the multidirectional airbag 30. Thus, the seat occupant D is protected against the oblique collision by the side airbag 22B, the belt 28 and the multidirectional airbag 30. A mode of protection of the seat occupant D by the vehicle occupant protection device 10 when there is a small overlap collision is broadly similar to the mode of protection of the seat occupant D by the vehicle occupant protection device 10 when there is an oblique collision.

As described above, with the vehicle occupant protection device 10, the seat occupant D may be protected against various modes of impact by the multidirectional airbag device 20, side airbag device 22 and seatbelt device 24 that are provided at the vehicle seat 12. Therefore, in an automobile in which the vehicle occupant protection device 10 is employed, other airbag devices may be omitted. For example, if the vehicle seat 12 at which the vehicle occupant protection device 10 is employed is a driver seat, a driver seat airbag device provided in a steering wheel, a curtain airbag device provided at a roof side portion, and the like may be omitted. As a further example, if the vehicle seat 12 at which the vehicle occupant protection device 10 is employed is a front passenger seat, a front passenger seat airbag device provided in an instrument panel, a curtain airbag device provided at a roof side portion, and the like may be omitted. As yet another example, if the vehicle seat 12 at which the vehicle occupant protection device 10 is employed is a seat in a second or subsequent row, a curtain airbag device provided at a roof side portion may be omitted.

—Operational Effects According to the Disposition of the Inflator—

The inflator 32 is fixed to the top frame 16FT of the seatback frame 16F that extends in the seat width direction, in the attitude with the long dimension of the inflator 32 in the seat width direction, and the gas is supplied from the inflator 32 to the airbag through the coupler 35. Consequently, the inflator 32 has no effect on designability of the headrest 18. That is, compared to a structure in which the inflator 32 is stowed in the headrest 18, a deterioration in designability of the headrest 18 caused by the inflator 32 is prevented or greatly reduced, and designability of the headrest 18 can be assured (freedom of design is high).

To describe this point further, the multidirectional airbag 30 that inflates and expands so as to surround the head H of the seat occupant D from three directions has a large capacity (for example, around 50 liters), and the size of the multidirectional airbag 30 in the folded state is large. Furthermore, the inflator 32 that supplies gas to the large-capacity multidirectional airbag 30 also has a large capacity and is large in size. If the multidirectional airbag 30 and inflator 32 were to be stowed together in the headrest 18, the headrest 18 would have to be large, and it would be difficult to assure designability of the headrest 18. However, in the present exemplary embodiment, because the inflator 32 is stowed in the seatback 16, designability of the headrest 18 as assured as mentioned above.

In contrast, in a comparative example in which the inflator is stowed in the seatback 16 in an attitude in which the long dimension direction thereof is in the vertical direction, an inflator 32V is disposed as illustrated by imaginary lines in FIG. 3. To be specific, an upper end portion of the inflator 32V is fixed to the top frame 16FT, and a lower end side of the inflator 32V is disposed at the rear face side of the seatback in order to assure cushioning of the seatback 16. As a result, the lower end side of the inflator 32V protrudes into the leg space LS. In contrast, in the present exemplary embodiment, because the inflator 32 is arranged along the seat width direction at the upper portion of the interior of the seatback 16, the inflator 32 has no effect on the leg space LS formed at the rear face side of the seatback 16. That is, compared to the inflator 32V described above, the inflator 32 prevents or effectively reduces a deterioration in functionality of the seatback 16, such as cushioning, assuring leg space and the like.

Thus, in the vehicle occupant protection device 10 according to the present exemplary embodiment, in the structure in which the multidirectional airbag 30 with a large volume is stowed in the headrest 18, deteriorations in designability of the headrest 18 and functionality of the seatback 16 may be reduced.

Figure 9:
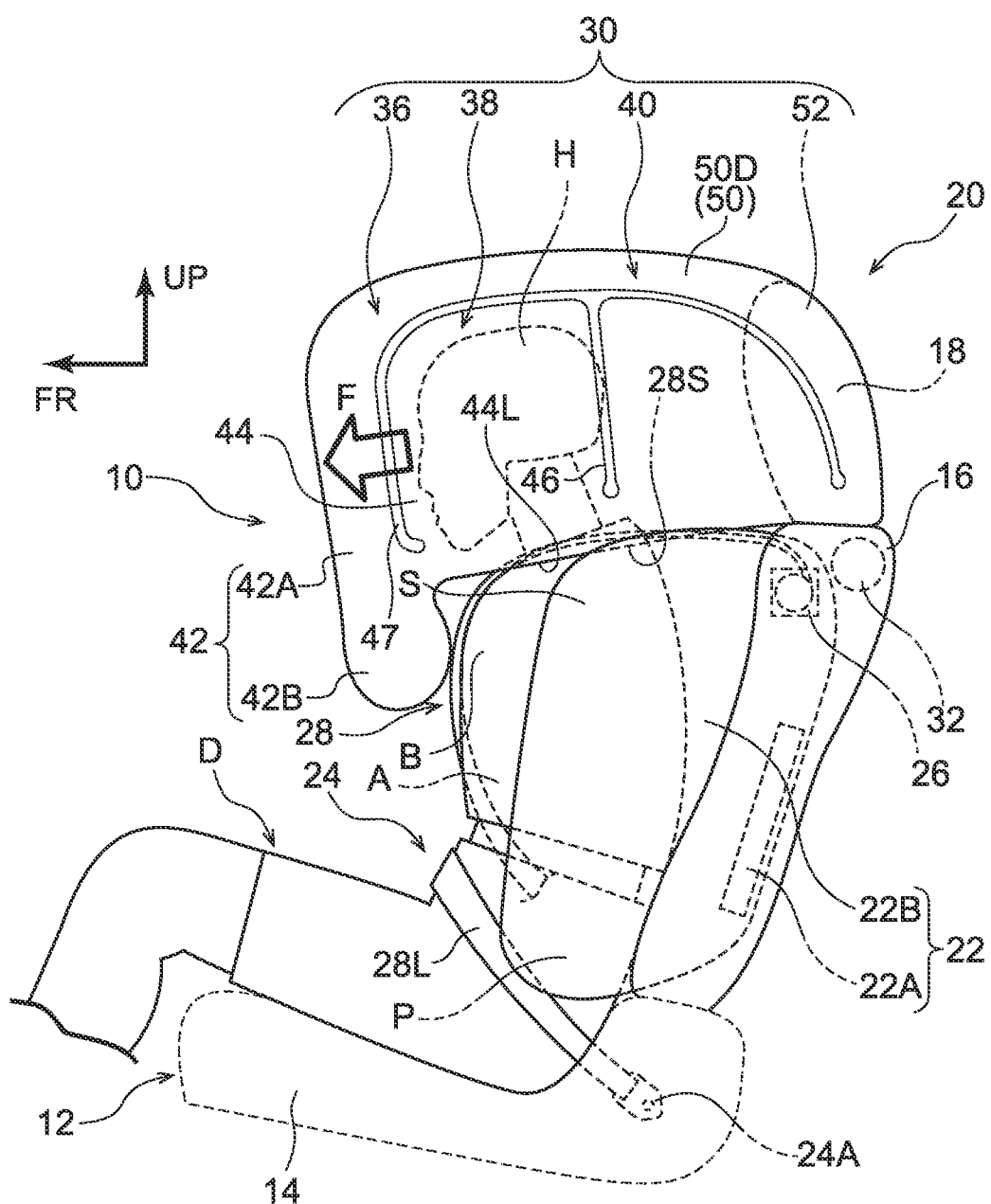
FIG. 9 is a side view schematically illustrating a vehicle occupant restraint state by the multidirectional airbag structuring the vehicle occupant protection device in accordance with the exemplary embodiment.

Further, when there is a frontal collision, an oblique collision or the like, in accordance with restraint of the head H and breast area B of the seat occupant D, as illustrated in FIG. 9, a load F toward the front (a reaction force) acts on the front expansion portion 36 of the multidirectional airbag 30. A portion of this load is braced at the seatback 16 (the seatback frame 16F) via the headrest 18 (the headrest stays 18S).

In the vehicle occupant protection device 10, the plug portion 35P of the coupler 35 that communicates between the inflator 32 and the multidirectional airbag 30 opposes (the front edge of the boss portion 16B of) the upper wall 16TT of the top frame 16FT from the rear thereof. Therefore, when the multidirectional airbag 30 is subjected to the above-mentioned load, the plug portion 35P of the coupler 35 interferes with the upper wall 16TT from the rear thereof. Thus, a portion of the load F that the multidirectional airbag 30 receives is dispersed into the seatback frame 16F via a region of interference between the plug portion 35P and the upper wall 16TT.

For example, in a comparative example in which the inflator 32 and multidirectional airbag 30 are in fluid communication through a flexible tube or the like instead of the coupler 35, a load that the multidirectional airbag 30 receives is concentrated at the regions of the seatback frame 16F at which the stay holders 34 are disposed. In contrast, in the present exemplary embodiment, a portion of the load F that the multidirectional airbag 30 receives may be dispersed into and braced by a different region from the regions of the seatback frame 16F at which the stay holders 34 are disposed, via the plug portion 35P of the coupler 35 as described above.

According to the above, deformation of the top frame 16FT of the seatback frame 16F may be suppressed (i.e., the top frame 16FT is reinforced), and an amount of movement toward the front by the head H of the seat occupant D when there is, for example, a frontal collision, an oblique collision or the like may be reduced. Moreover, because the coupler 35 is disposed between the pair of stay holders 34 in the seat width direction, the load F that the multidirectional airbag 30 receives can be dispersed and braced by the seatback frame in a well-balanced manner. In particular, because the pair of stay holders 34 and the coupler 35 are disposed equidistantly in the seat width direction, the load F that the multidirectional airbag 30 receives can be dispersed and braced by the seatback frame 16F in an even more well-balanced manner.

In the vehicle occupant protection device 10, the stud bolts SB that fix the inflator 32 to the lower wall 16TL penetrate through the lower wall 16TL. Therefore, when the multidirectional airbag 30 is subjected to a load F during a frontal collision as described above, as well as the plug portion 35P of the coupler 35 interfering with the upper wall 16TT from the rear thereof, the stud bolts SB interfere with the lower wall 16TL from the front thereof. Therefore, the load F that the multidirectional airbag 30 receives can be dispersed into and braced by the upper wall 16TT and the lower wall 16TL, and local deformations of the top frame 16FT, the plug portion 35P and the stud bolts SB are suppressed (i.e., the top frame 16FT is even more effectively reinforced.). Therefore, deformation of the top frame 16FT of the seatback frame 16F is even more effectively suppressed, and an amount of movement toward the front by the head H of the seat occupant D during, for example, a frontal collision, an oblique collision or the like may be kept even smaller.

In particular, because the plug portion 35P of the coupler 35 penetrates through the penetrating hole 16H formed in the upper wall 16TT, the region of interference between the plug portion 35P and the upper wall 16TT is unlikely to be shifted in the seat width direction by the load F that the multidirectional airbag 30 receives. Therefore, the load F that the multidirectional airbag 30 receives during, for example, an oblique collision, a small overlap collision or the like can be effectively dispersed into the upper wall 16TT via the plug portion 35P. Similarly, because the stud bolts SB penetrate through the lower wall 16TL, the load F that the multidirectional airbag 30 receives when there is, for example, an oblique collision, a small overlap collision or the like can be efficiently dispersed into the lower wall 16TL via the stud bolts SB.

Because the plug portion 35P of the coupler 35 penetrates through the penetrating hole 16H formed in the upper wall 16TT, the gas is supplied along a shorter path from the inflator 32 to the multidirectional airbag 30 than in a structure in which a fluid communication structure goes around the rear edge of an upper wall.

In the vehicle occupant protection device 10, the inflator 32 is disposed between the opposing faces of the upper wall 16TT and lower wall 16TL of the top frame 16FT that structures the upper portion of the seatback frame 16F. That is, the inflator 32 is disposed to effectively utilize a cavity formed in a structure that is for assuring stiffness of the seatback frame 16F. Thus, a deterioration in functionality of the seatback 16 caused by the inflator 32 is prevented or even more effectively reduced.

Variant Examples

In the exemplary embodiment described above, an example is illustrated in which the inflator 32 is fixed to the lower wall 16TL of the top frame 16FT, but the present disclosure is not limited thus. For example, the variant example structures illustrated below may be employed. In these variant examples, structures that are basically the same as in the above exemplary embodiment are assigned the same reference symbols and may not be described or illustrated in the drawings.

First Variant Example

Figure 10A:
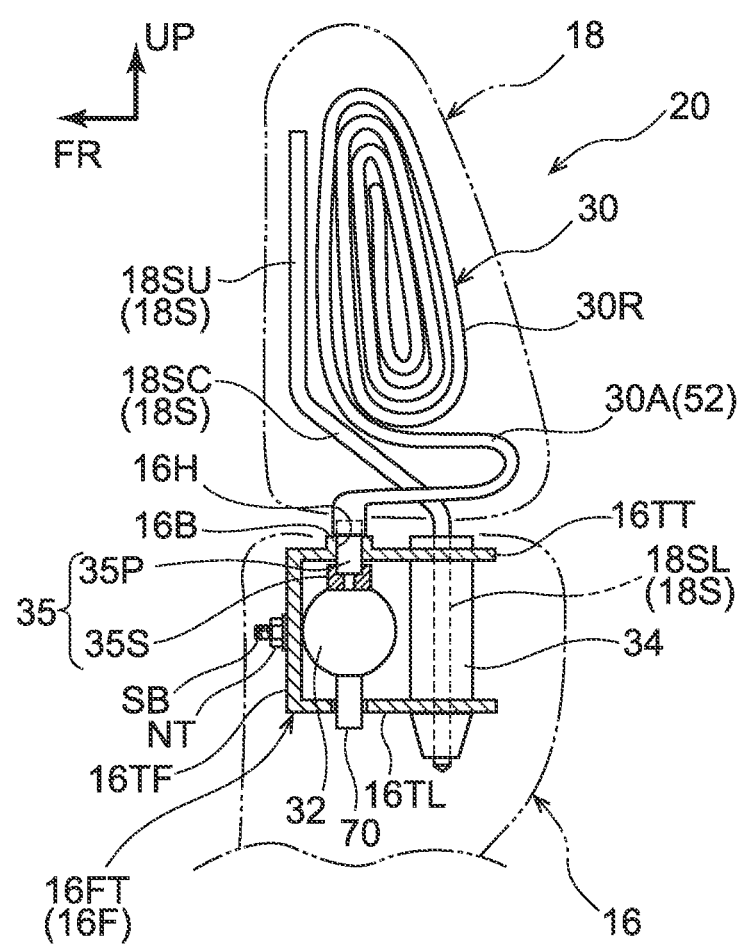
FIG. 10A is a magnified schematic side sectional diagram of principal portions of a vehicle occupant protection device in accordance with a first variant example of the exemplary embodiment.

For example, as illustrated in FIG. 10A, a structure is possible in which the inflator 32 is fixed to the front wall 16TF. That is, in the first variant example illustrated in FIG. 10A, the front wall 16TF corresponds to the "fixing portion" of the present disclosure. The inflator 32 according to the first variant example is disposed at the front side relative to the stay holders 34. An engaging pin 70 that serves as the protruding portion protrudes downward from the inflator 32 according to the first variant example; the engaging pin 70 penetrates through the lower wall 16TL. In the example illustrated in FIG. 10A, the engaging pin 70 is disposed at the same position as the coupler 35 in the seat width direction. That is, the engaging pin 70 is disposed between the pair of stay holders 34 in the seat width direction, and is disposed equidistantly in the seat width direction between the pair of stay holders 34.

In the structure according to the first variant example, the same effects may be provided by the same operations as in the exemplary embodiment described above. In the first variant example, structures are possible in which the engaging pin 70 is not provided and structures are possible in which two or more of the engaging pin 70 are provided. In the former case, the top frame 16FT is not limited to a structure that includes the lower wall 16TL. For example, the top frame 16FT may be formed in an "L" shape in side view or a "C" shape (a "U" shape) that opens downward.

In the above exemplary embodiment and the first variant example, examples are illustrated in which the plug portion 35P of the coupler 35 penetrates through the penetrating hole 16H of the upper wall 16TT, but the present disclosure is not limited thus. For example, rather than penetrating through the penetrating hole 16H, the plug portion 35P may be disposed so as to interfere with the rear edge of the upper wall 16TT from directly therebehind in accordance with a load F. Among structures in which the plug portion 35P penetrates through the penetrating hole 16H, structures are possible in which the boss portion 16B is not formed. Structures are also possible in which, instead of the structure in which the plug portion 35P penetrates through the penetrating hole 16H, the socket portion 35S structuring the coupler 35 penetrates through the penetrating hole 16H alone or together with the plug portion 35P. In this case, the socket portion 35S (and plug portion 35P) or the coupler 35 including the socket portion 35S corresponds to the "pipe portion" and the "region disposed at the rear in the seat front-rear direction relative to the upper portion of the seatback frame" of the present disclosure.

Second Variant Example

Figure 10B:
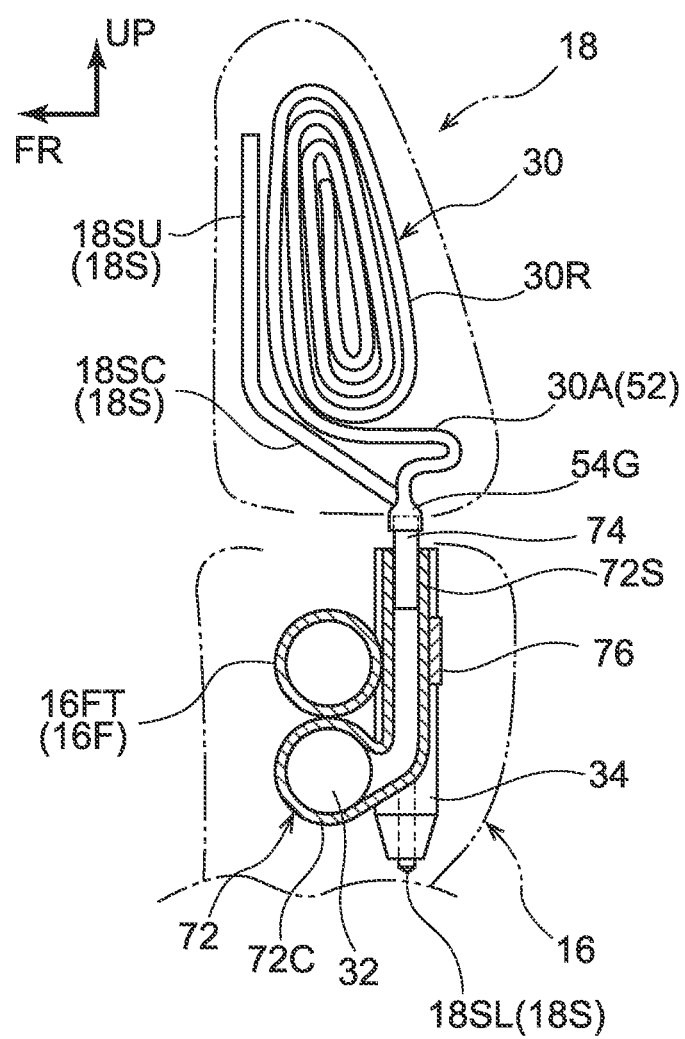
FIG. 10B is a magnified schematic side sectional diagram of principal portions of a vehicle occupant protection device in accordance with a second variant example of the exemplary embodiment.

As a further example, as illustrated in FIG. 10B, the top frame 16FT may be structured by a pipe member. In the second variant example illustrated in FIG. 10B, the inflator 32 is arranged along the seat width direction at a lower edge of the top frame 16FT. The inflator 32 is disposed inside a diffuser 72 and is fixed to the top frame 16FT via the diffuser 72. In the example illustrated in FIG. 10B, the diffuser 72 is restrained (retained) at the top frame 16FT by restraining bands 76.

The diffuser 72 includes a cylinder portion 72C that covers the inflator 32 and a socket portion 72S that extends upward from a rear portion of the cylinder portion 72C. The diffuser 72 jets out the gas generated by the inflator 32 from an upper side opening that is formed in the socket portion 72S to be a jetting out opening. A plug portion 74 of which one end is connected to the multidirectional airbag 30 is attached to this upper side opening to allow flows of the gas. The fluid communication structure of the present disclosure is structured with the diffuser 72 and plug portion 74 described above as principal portions thereof. In the second variant example, the socket portion 72S corresponds to the "region disposed at the rear in the seat front-rear direction relative to the upper portion of the seatback frame" of the present disclosure.

In the structure according to the second variant example, the same effects may be provided by the same operations as in the above exemplary embodiment, apart from the operational effects associated with interference between the plug portion 35P and the upper wall 16TT and interference between the stud bolts SB and the lower wall 16TL in accordance with the load F. In the second variant example, when the multidirectional airbag 30 is subjected to a load F, the socket portion 72S of the diffuser 72 interferes with the top frame 16FT from the rear thereof. A portion of the load F that the multidirectional airbag 30 receives is dispersed into the top frame 16FT via this region of interference. Consequent effects are similar to the case of interference between the plug portion 35P and the upper wall 16TT in accordance with the load F.

The second variant example is not limited to the structure in which the inflator 32 is disposed at the lower side of the top frame 16FT. For example, the inflator 32 may be disposed at the front side, upper side, rear side or the like of the top frame 16FT. The second variant example is also not limited to the structure in which the inflator 32 is covered by the diffuser 72. For example, the inflator 32 and the multidirectional airbag 30 may be put into fluid communication using a coupler similar to that of the above exemplary embodiment (although with different dimensions).

Alternative Variant Examples

In the exemplary embodiment described above, an example is illustrated in which the vehicle occupant protection device 10 is equipped with the side airbag device 22, but the present disclosure is not limited thus. For example, the vehicle occupant protection device 10 may be a structure that is not equipped with the side airbag device 22. Moreover, structures in which the vehicle occupant protection device 10 is equipped with a side airbag device are not limited to the structure in which the side airbag device is provided at the vehicle seat 12. For example, the vehicle occupant protection device 10 may be a structure that is equipped with a side airbag device provided at a side door or the like. Further, in the above exemplary embodiment, an example is illustrated in which the vehicle occupant protection device 10 is equipped with the side airbag device 22 at the vehicle width direction outer side, but the present disclosure is not limited thus. For example, the vehicle occupant protection device 10 may be a structure that is equipped with a side airbag device disposed at the vehicle width direction middle side instead of or in addition to the side airbag device 22 at the vehicle width direction outer side.

In the above exemplary embodiment, an example is illustrated in which the vehicle occupant protection device 10 is equipped with the seatbelt device 24, but the present disclosure is not limited thus. For example, the vehicle occupant protection device 10 may be a structure that is not equipped with the seatbelt device 24. Moreover, structures in which the vehicle occupant protection device 10 is equipped with a seatbelt device are not limited to structures in which the seatbelt device is provided at the vehicle seat 12. For example, a structure is possible in which the retractor, the anchor, the buckle and so forth are provided at the vehicle body. Furthermore, structures in which the vehicle occupant protection device 10 is equipped with a seatbelt device are not limited to three-point seatbelt devices. A seatbelt device may also be a four-point or two-point seatbelt device.

In the above exemplary embodiment, an example is illustrated in which the seat width direction of the vehicle seat 12 matches the vehicle width direction, but the present disclosure is not limited thus. For example, the vehicle seat 12 may be disposed at an angle relative to the vehicle body, and structures are possible in which the orientation of the vehicle seat 12 relative to the vehicle body can be altered (turned about a vertical axis). In such a structure, a structure that is equipped with the multidirectional airbag 30 that inflates and expands to surround the head H of a seat occupant D may provide excellent protection for the head H. Furthermore, because the multidirectional airbag 30 prior to inflation and expansion is stowed in the headrest 18, interference with inner surfaces of the vehicle cabin, structural components inside the vehicle cabin and suchlike is unlikely, and obstruction of an operation to alter the orientation of the vehicle seat 12 relative to the vehicle body is mitigated or prevented. Moreover, the vehicle seat 12 is not limited to a structure disposed at a position that is offset from the middle of the vehicle body in the vehicle width direction. For example, the middle of the vehicle seat 12 in the seat width direction may match the middle of the vehicle body in the vehicle width direction.

In the above exemplary embodiment, an example is illustrated in which the multidirectional airbag 30 structuring the multidirectional airbag device 20 is wholly stowed in the headrest 18, but the present disclosure is not limited thus. For example, a portion of the multidirectional airbag 30 structuring the multidirectional airbag device 20 may be disposed in the seatback 16. In the above exemplary embodiment, an example is illustrated in which height adjustment of the headrest 18 is possible, but the present disclosure is not limited thus. For example, a structure is possible in which the folding portion 30A for height adjustment of the headrest 18 is not specified.

In the above exemplary embodiment and variant examples, an example is illustrated in which the multidirectional airbag 30 and the inflator 32 are put into fluid communication via the coupler 35 fabricated of metal or via the diffuser 72 and plug portion 74, but the present disclosure is not limited thus. For example, a structure is possible in which the gas entry portion 54G is connected directly to a connection pipe that protrudes from the inflator 32. This connection pipe is preferably a structure that interferes with the upper wall 16TT of the top frame 16FT in response to a load toward the front that the multidirectional airbag 30 receives, but this is not limiting.

In the above exemplary embodiment, an example is illustrated in which the multidirectional airbag 30 receives the supply of gas from the inflator 32 through the gas entry portion 54G at a single location, but the present disclosure is not limited thus. For example, a structure is possible in which the left and right rear duct portions 54 are not joined but separate gas entry portions 54G are provided. In this case, the coupler 35, the combination of the diffuser 72 and plug portion 74 or the like may be disposed at two locations that are separated in the seat width direction. The coupler 35, the combination of the diffuser 72 and plug portion 74 or the like that are disposed at two locations separated in the seat width direction may be disposed at the seat width direction outer sides relative to the stay holders 34.

In the above exemplary embodiment, an example is illustrated in which the multidirectional airbag 30 includes the rear expansion portion 52, but the present disclosure is not limited thus. It is sufficient if the multidirectional airbag includes at least a front inflation portion and left and right side inflation portions. However, it is preferable if an upper inflation portion is provided in addition to the front inflation portion and the left and right side inflation portions.

In the above exemplary embodiment, an example is illustrated in which the front expansion portion structuring the multidirectional airbag 30 includes the mesh portion 40, but the present disclosure is not limited thus. For example, structures are possible in which a transparent sheet is provided instead of the mesh portion 40 to serve as a view-enabling structure, and structures that do not include a view-enabling structure are possible. In this case, at least a portion of the front inflation portion may be an inflation portion that receives a supply of gas and is disposed to inflate and expand directly in front of the head H of the seat occupant D.

In the above exemplary embodiment, an example is illustrated in which the multidirectional airbag 30 is outside roll-folded, but the present disclosure is not limited thus. For example, the multidirectional airbag 30 may be stowed in the headrest 18 or the like in an alternative folding mode such as bellows folding or the like.

In the above exemplary embodiment, an example is illustrated in which the multidirectional airbag device 20 is equipped with the expansion guide cloth 58, but the present disclosure is not limited thus. For example, structures are possible that are not equipped with the expansion guide cloth 58. As further examples, instead of a structure in which the expansion guide cloth 58 is provided, a ceiling member of the vehicle cabin ceiling may be structured by a low friction material or a low friction treatment may be applied to the vehicle cabin ceiling.

It will be clear that the present disclosure may be embodied with numerous modifications within a scope that does not depart from the spirit of the present disclosure. For example, the structures (elements) of the exemplary embodiment and variant examples described above may be combined or substituted.

What is claimed is:

1. A vehicle occupant protection device comprising:
   an airbag that is configured to be stowed in a headrest, to receive a gas supply and is formed as a single bag body that, in an inflated and expanded state, the airbag including
   a front inflation portion configured to be disposed at a front in a seat front-rear direction relative to a head of a vehicle occupant,
   and a pair of side inflation portions configured to be disposed at both sides in a seat width direction relative to the head of the vehicle occupant;
   an inflator that is fixed to an upper portion of a seatback frame in an attitude with a long dimension of the inflator in the seat width direction, the upper portion of the seatback frame extending in the seat width direction; and
   a fluid communication structure that communicates between the inflator and the airbag to allow a flow of gas, the fluid communication structure including a pipe portion fabricated of metal that is connected to the inflator such that, when the airbag in the inflated and expanded state receives a load toward a front in the seat front-rear direction, the pipe portion interferes with the upper portion of the seatback frame from rearward thereof in the seat front-rear direction, wherein;
   the inflator is configured to be fixed at a fixing portion of the upper portion of the seatback frame and to be covered from above by an upper wall of the upper portion of the seatback frame,
   when the airbag in the inflated and expanded state receives a load toward a front in the seat front-rear direction, the pipe portion interferes with the upper wall from rearward thereof in the seat front-rear direction,
   the inflator is configured to be covered from below by a lower wall of the upper portion of the seatback frame, and
   the vehicle occupant protection device further comprises a protrusion portion fabricated of metal that protrudes from the inflator and penetrates through the lower wall such that, when the airbag in the inflated and expanded state receives a load toward the front in the seat front-rear direction, the protrusion portion interferes with the lower wall from forward thereof in the seat front-rear direction.

2. The vehicle occupant protection device according to claim 1, wherein the pipe portion communicates between the inflator and the airbag to allow the flow of gas in a state in which the pipe portion penetrates through the upper wall of the upper portion of the seatback frame.

3. The vehicle occupant protection device according to claim 1, wherein
   at least one of the pipe portion and the protrusion portion is disposed between a pair of stay holders in the seat width direction, the pair of stay holders supporting stays of the headrest at the seatback frame, being spaced apart in the seat width direction, and being fixed to the upper portion of the seatback frame.

4. The vehicle occupant protection device according to claim 1, wherein
   the inflator is disposed between opposing faces of the upper wall and the lower wall and is fixed to the fixing portion, the fixing portion being the lower wall or a connecting wall of the upper portion of the seatback frame, the connecting wall connecting the upper wall with the lower wall.

5. The vehicle occupant protection device according to claim 1, wherein the fluid communication structure includes a region disposed at a rear in the seat front-rear direction relative to the upper portion of the seatback frame such that, when the airbag in the inflated and expanded state receives a load toward the front in the seat front-rear direction, the region interferes with the upper portion of the seatback frame from rearward thereof in the seat front-rear direction.

6. The vehicle occupant protection device according to claim 1, wherein:
   the upper portion of the seatback frame further comprises a connecting wall connecting the upper wall and the lower wall, and
   the inflator is disposed between opposing faces of the upper wall and the lower wall, and is fixed to the lower wall by nuts being screwed onto stud bolts in a state in which the stud bolts penetrate through the lower wall, the stud bolts serving as the protrusion portion.

7. The vehicle occupant protection device according to claim 1, wherein:
   the upper portion of the seatback frame further comprises a connecting wall connecting the upper wall and the lower wall, and
   the inflator is fixed to the connecting wall by nuts being screwed onto stud bolts in a state in which the stud bolts penetrate through the connecting wall, and comprises an engaging pin that protrudes downward from the inflator, penetrates through the lower wall, and serves as the protruding portion.

* * * * *